United States Patent
Yamamoto et al.

[11] Patent Number: 5,940,633
[45] Date of Patent: *Aug. 17, 1999

[54] LENS BARREL

[75] Inventors: Haruhisa Yamamoto, Fujisawa; Norio Nakai, Kawaguchi, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/988,360

[22] Filed: Dec. 10, 1997

[30] Foreign Application Priority Data

Dec. 10, 1996 [JP] Japan .................................. 8-346770
May 13, 1997 [JP] Japan .................................. 9-137668
Oct. 17, 1997 [JP] Japan .................................. 9-303477

[51] Int. Cl.⁶ .................................................. G03B 3/10
[52] U.S. Cl. .............................. 396/85; 396/131; 396/508
[58] Field of Search ................................ 396/85, 72, 131, 396/137, 144, 505, 508; 359/701, 694, 739, 825

[56] References Cited

U.S. PATENT DOCUMENTS 4,763,987  8/1988  Ando ........................................ 350/255
5,305,036  4/1994  Tanaka ..................................... 396/131
5,528,430  6/1996  Hamasaki ................................. 359/701
5,561,564  10/1996  Nakamura et al. ..................... 359/825
5,654,833  8/1997  Fujike et al. ............................ 359/822
5,657,173  8/1997  Imanari et al. ......................... 359/825

FOREIGN PATENT DOCUMENTS 0 684 496  11/1995  European Pat. Off. .
7-239436  9/1995  Japan .
7-281075  10/1995  Japan .
7-310769  11/1995  Japan .

OTHER PUBLICATIONS

European Search Report dated Apr. 17, 1998.

*Primary Examiner*—W. B. Perkey
*Attorney, Agent, or Firm*—Fitzpatrick, Cella, Harper & Scinto

[57] ABSTRACT

A lens barrel includes an optical lens having an optical axis, an operation ring substantially cylindrical and operable about the optical axis to move the optical lens along the optical axis thereof, and a slidable contact member slidably in contact with the inner circumferential surface of the operation ring, the slidable contact member providing a specific load against the inner circumferential surface thereof. The operational torque of the operation force is changed when the slidable contact member moves in the optical axis direction by changing its contact area with the inner circumferential surface of the operation ring.

10 Claims, 23 Drawing Sheets

OPTICAL AXIS DIRECTION

LENS BARREL

BACKGROUND OF THE INVENTION

1. Field of the Invention

The present invention relates to an optical barrel to manually operate or electrically drive an operation ring for operating a focus, a zoom, an iris, or other lens, respectively.

2. Related Background Art

Conventionally, such an optical barrel has been installed with a driving unit in order to operate an operation ring electrically. The operation ring can be operated both electrically and manually. Such driving unit comprises a driving motor for electrical operation; a driving power transmission mechanism for transmitting the driving power of the driving motor to the operation ring; and a driving power interruption mechanism for interrupting the transmission of the driving power to the operation ring in order to perform the manual operation thereof.

Generally, when the operation ring is electrically driven, it is necessary to rotate the ring with a lower load for the improvement of the rotational speed of the operation ring, as well as for the lower dissipation of electric power required for driving the driving motor. In contrast, there is a need for the provision of an appropriate load given to the operation ring so as to facilitate the operation thereof when the operation ring is manually operated. However, if the structure is arranged so that the operation ring is rotatable with a lower load, there is a possibility that the operation ring will rotate easily just by a slight touch. As a result, it is difficult to operate the operation ring smoothly at an extremely slow speed. With a view to solving such a problem, a highly viscous grease, a friction member, or the like has been inclusively installed for the sliding portion of the operation ring, so that a load is given to the operation ring in accordance with the conventional art.

On the other hand, there is disclosed an optical barrel in the specification of Japanese Patent Laid-Open Application No. 7-310769, which is capable of controlling loads needed for the zooming operation that should be carried out in good condition with respect to the zoom lens for a large camera used for a television broadcasting station.

However, these conventional devices make it considerably difficult to incorporate such mechanism in a lens barrel having limited space, such as adopted for use of a handy lens, because the structure of these devices becomes inevitably larger for providing the loads of the operating power for them.

SUMMARY OF THE INVENTION

It is a first object of the present invention to install an optical barrel which is made smaller, and also, made capable of obtaining operational loads in good condition.

Also, it is a second object of the invention to install an optical barrel capable of setting the exertion of loads appropriately both at the time of performing an electric drive operation and a manual operation thereof.

Further, it is a third object of the invention to install an optical barrel capable of changing loads as desired at the time of performing a manual operation thereof.

More specifically, a lens barrel comprises an optical lens having an optical axis; a substantially cylindrical operation ring about the optical axis for enabling the optical lens to move along the optical axis thereof; an a slidable contact member to be slidably in contact with the inner circumferential surface of the operation ring. The slidable contact member of this lens barrel installs a predetermined friction power on the inner circumferential surface thereof. Particularly, the slidable contact member is movable in the direction of the optical axis, and the structure is arranged so as to change the operational torques of the operation ring when the area changes with respect to the inner circumferential surface.

More specifically, an optical barrel is arranged to enable an optical lens having the optical axis to move by rotating a substantially cylindrical operation ring about the optical axis. This optical barrel is installed with a substantially ring-shaped and thin plate having the optical axis as the center thereof, and a substantially ring-shaped and elastic member having the optical axis as the center thereof. Then, a structure is arranged so that the cylindrical surface of the operation ring and the ring surface of the thin plate should be in contact with each other, while the thin plate is biased to the operation ring by means of the elastic member.

Also, in accordance with the present invention, the lens barrel is an optical barrel that enables an optical member having the optical axis to move when a substantially cylindrical operation ring is caused to rotate about the optical axis. This lens barrel allows a substantially ring type thin plate having the optical axis as the center thereof to be in contact with the cylindrical surface of the operation ring, at the same time, making the area of the contact surface variable.

DETAILED DESCRIPTION OF THE PREFERRED EMBODIMENTS

Hereinafter, with reference to the accompanying drawings, the detailed description will be made of the embodiments in accordance with the present invention.

Figure 1:
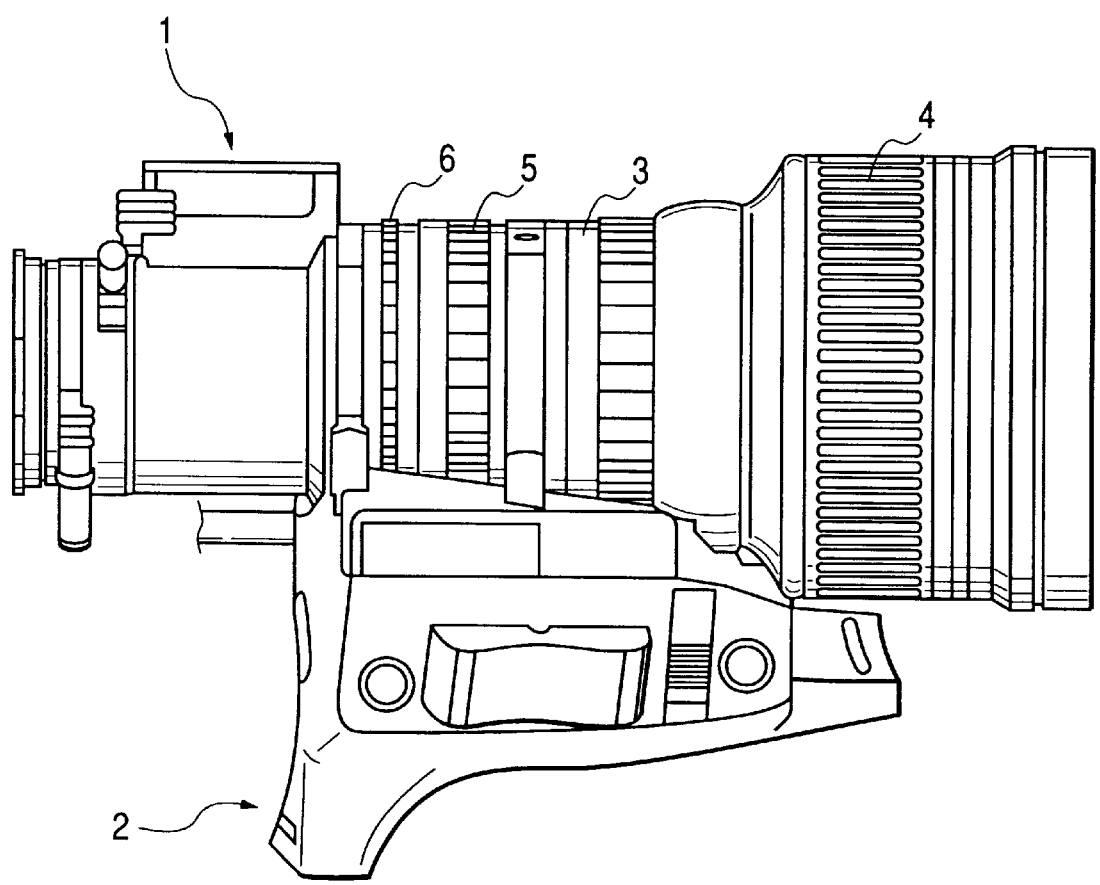
FIG. 1 is a sectional side view which shows a lens barrel embodying the present invention.
Figure 2:
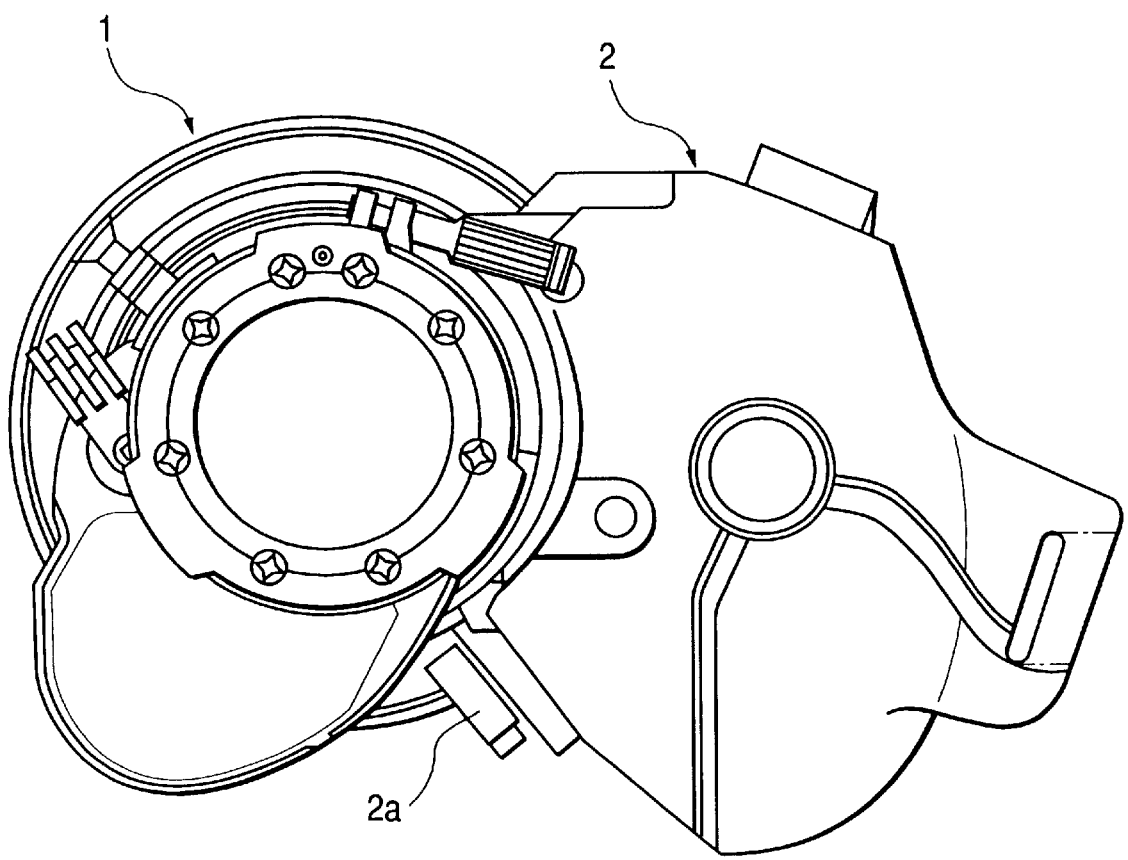
FIG. 2 is a rear view which shows the lens barrel shown in FIG. 1.

FIG. 1 is a partial side view showing a lens barrel embodying the present invention. FIG. 2 is a rear view thereof, in which the optical barrel is arranged for use with a phototaking lens adopted for a television camera, for example, and a driving unit 2 is installed for the main body 1 of the apparatus. For the fixed barrel 3 of the apparatus main body 1, substantially cylindrical operation rings 4, 5, and 6 are rotatively installed in order to operate optical members having the optical axis (not shown) such as a focus lens, a zoom lens, an iris lens, respectively. Then, the driving unit 2 is assumed to electrically operate the operation ring 5 for use of the zoom lens, for example. For the driving unit 2, a switching knob 2a is arranged in order to switch the electric drive or the manual drive of the operation ring 5 as shown in FIG. 2.

Figure 3:
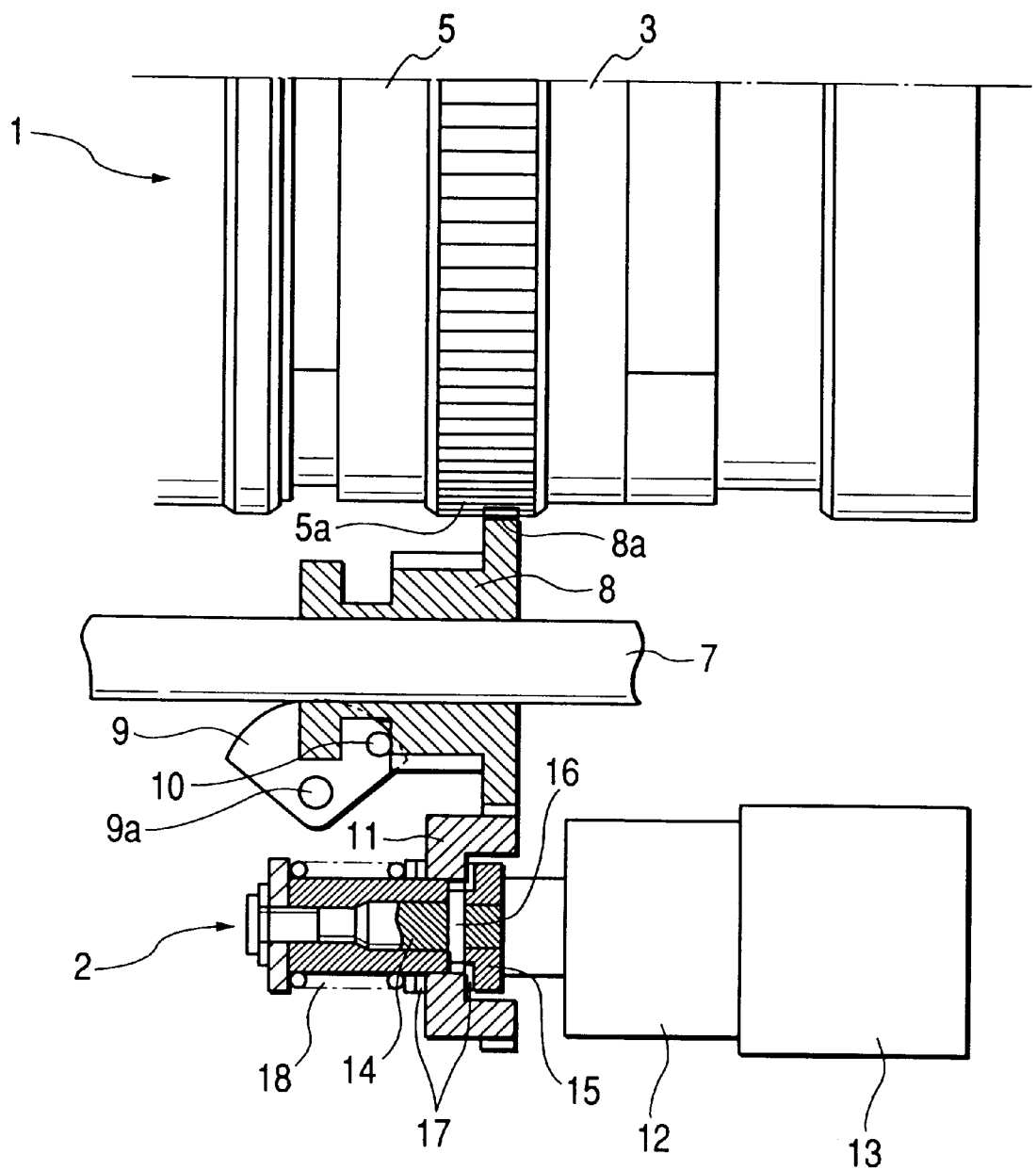
FIG. 3 is a partially sectional view which shows a driving unit.

As shown in FIG. 3 which is a partially cross-sectional view, the tooth 8a of the intermediate gear 8, which is slidably supported on the fixed shaft 7, is arranged to engage with the tooth 5a formed on the outer circumference of the operation ring 5 for the driving unit 2. With the intermediate gear 8, the pin 10 of a clutch plate 9 engages to cause the intermediate gear 8 to shift forward and backward by the rotation of the clutch plate 9. An output gear 11 engages with the intermediate gear 8. The output gear 11 is connected with a driving motor 13 through transmitting means 12. In this case, a sleeve 15 is fixed to the output shaft 14 of the transmitting means 12 by means of a pin 16. The output gear 11 is rotatively mounted on the sleeve 15. Further, the sleeve 15 is biased by a spring 18 by way of a sliding washer 17.

Figure 4:
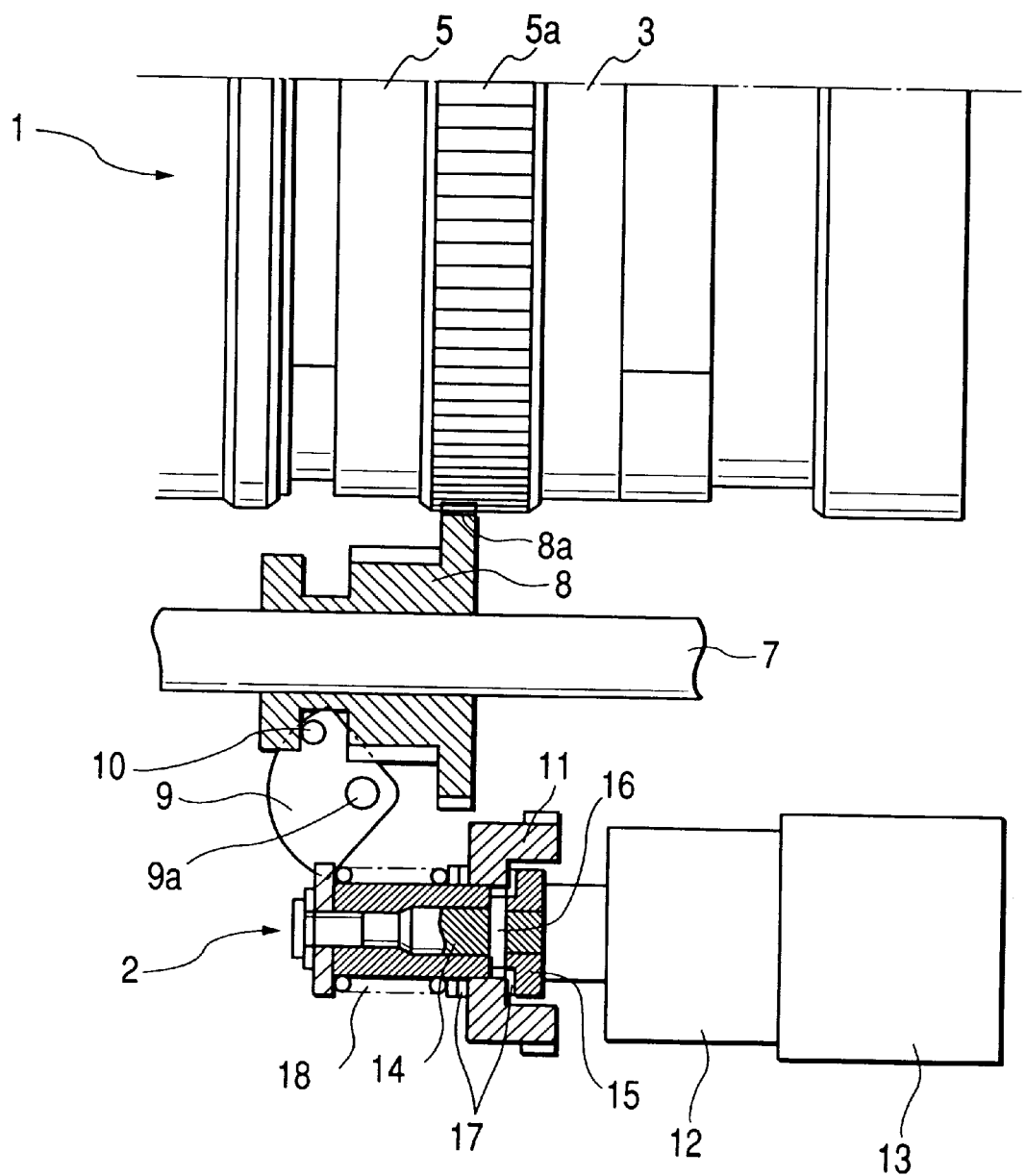
FIG. 4 is a view which illustrates operation of the driving unit shown in FIG. 3

Thereby, a limiter mechanism is constituted. For example, if a lens does not move any longer at the zooming end and the load given to the operation ring 5 becomes excessive, the driving power of the driving motor 13, which is transmitted to the operation ring 5, is restricted. Also, if the operation ring 5 should manually be operated, the engagement between the intermediate gear 8 and the output gear 11 is released when the clutch plate 9 is rotated about the axis 9a as shown in FIG. 4.

Figure 5:
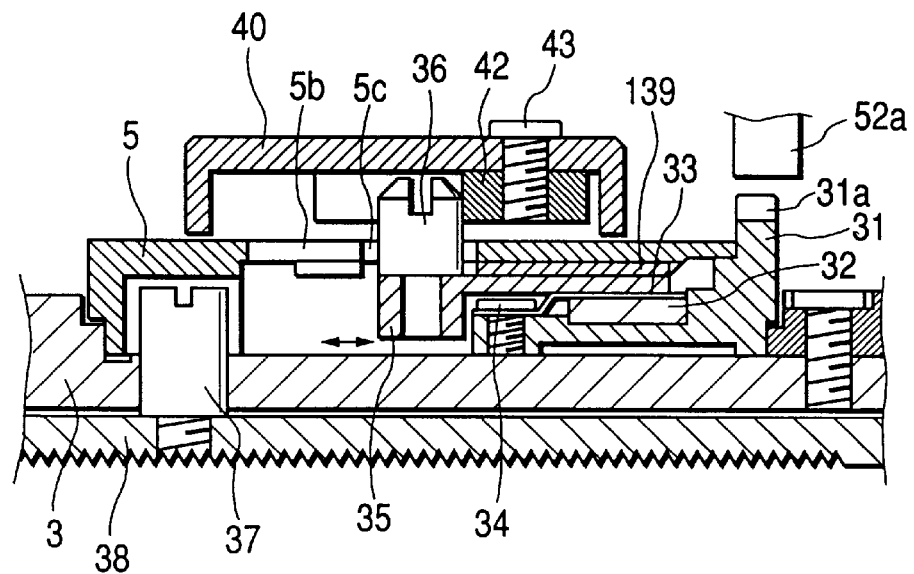
FIG. 5 is a partially sectional view which shows a load adjustment mechanism.
Figure 6:
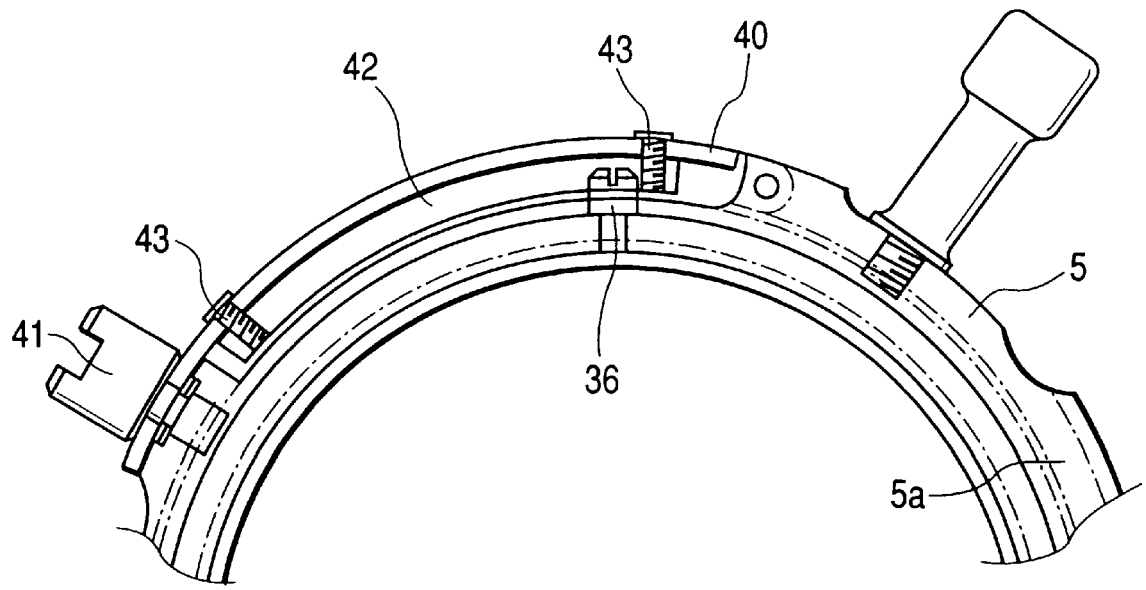
FIG. 6 is a partial front view which shows the load adjustment mechanism shown in FIG. 5.
Figure 7:
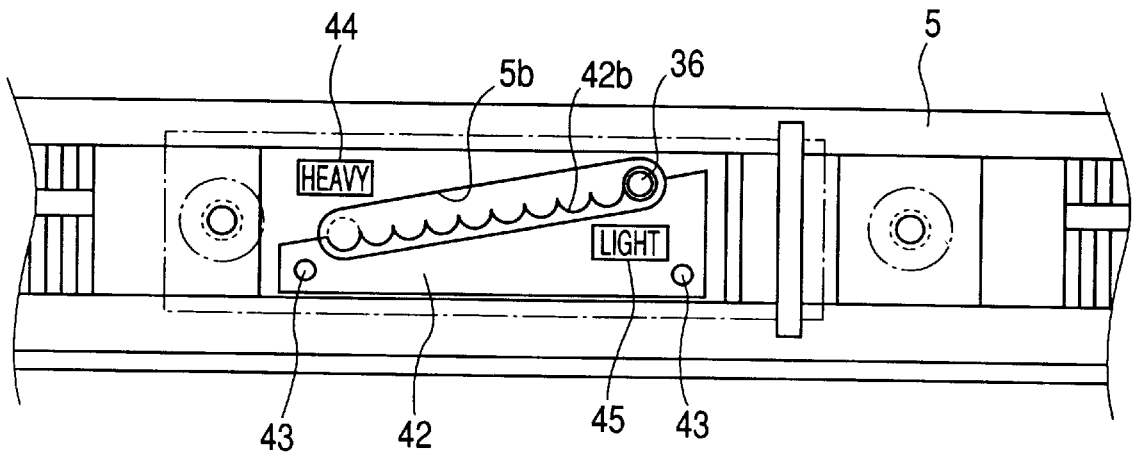
FIG. 7 is a partial plan view thereof.
Figure 8:
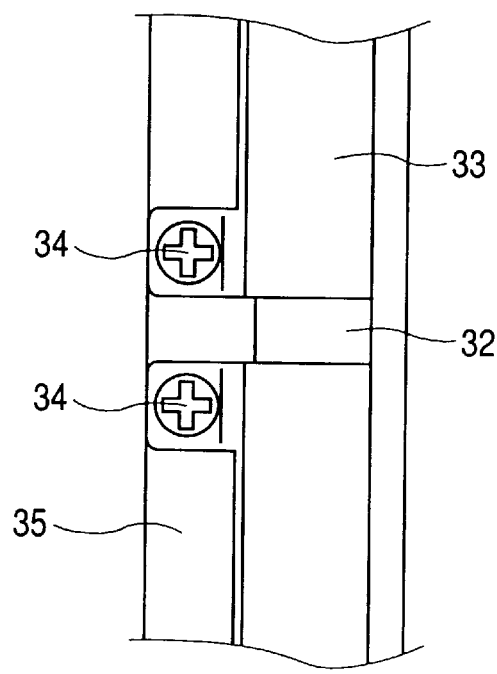
FIG. 8 is a cross-sectional view which shows the state when a friction ring is installed.

FIG. 5 is a partially cross-sectional view which shows the load adjustment mechanism of the operation ring 5, taken in the optical axis direction thereof. FIG. 6 is a partial side view of such mechanism shown on the plane, taken in the direction perpendicular to the optical axis. FIG. 7 is a partial plan view wherein the mechanism shown in FIG. 5 or 6 is viewed from above. On the outer circumference of the fixed barrel 3, which is installed in front of the operation ring 5, for example, a substantially cylindrical supporting member 31 is arranged. This supporting member is released by means of a switching knob, which will be described later, at the time of electric operation. This member is fixed with respect to the fixed barrel 3 at the time of manual operation. As shown in FIG. 8, which is a partial plan view, a ring-shaped elastic member 32 is installed on the outer circumference of the supporting member 31. Likewise, on the outer circumference of the elastic member 32, a ring type thin plate member 33 is installed. The thin plate member 33 is fixed to the supporting member 31 by means of fixing screws 34.

Also, on the outer side of the thin plate member 33, a substantially cylindrical friction ring 35 is slidably arranged. For the friction ring 35, an adjustment pin 36 is installed outwardly in order to adjust the friction power thereof. It is arranged to transmit the rotation of the operation ring 5 to the rotational barrel 38 in the barrel 22 by way of a pin 37. Between the friction ring 35 and the operation ring 5, a feed screw 39 resides inclusively. The feed screw 39 is for example of a helicoid type, so as to displace the friction ring 35 in the thrusting direction. For the friction ring 35, a male screw is installed, while a female screw is installed for the operation ring 5. In this way, the friction ring 35 is made movable forward and backward when adjustment is made. On the other hand, a cover 40 is fixed on the outer circumference of the operation ring 5 by means of a knob 41 so as to cover the adjustment pin 36. On the inner circumference of the cover 40, a pin locking member 42 is fixed by means of fixing screws 43 so as to lock the adjustment pin 36.

For the operation ring 5, a hole 5b is formed in the diagonal direction (see FIG. 7) when the adjustment pin 36 rotates. For the pin lock member 42 which is fixed to the cover 40, a number of round grooves 42b shown in FIG. 7 are arranged on the front wall side of the guide hole 5b, for example, so as to allow the adjustment pin 36 to be fitted into each of the grooves for positioning. On the left side end of the guide hole 5b, a label 44 is affixed to indicate "HEAVY", while on the right side end of the guide hole 5b, a label 45 is affixed to indicate "LIGHT".

Then, when the adjustment pin 36 is caused to shift in the direction toward the label indicating "HEAVY", the friction ring 35 shifts forward, that is, to the supporting member 31 side, while being rotated. Hence, the contact area is increased between the friction ring 35 and the thin plate member 33. Also, if the adjustment pin 36 is caused to shift in the direction toward the label indicating "LIGHT", the friction ring 35 shifts to the side opposite to the supporting member 31 so that the contact area is decreased between the friction ring 35 and the thin plate member 33.

Figure 9:
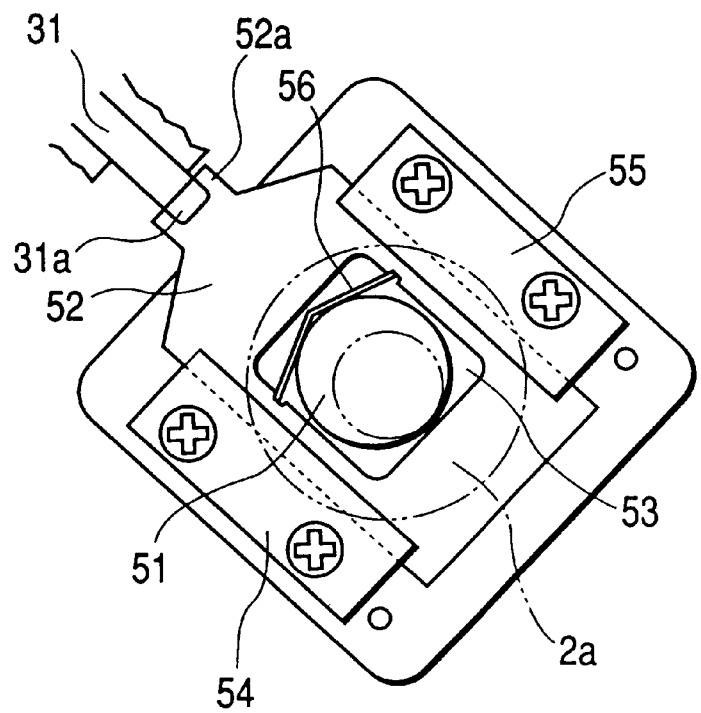
FIG. 9 is a detailed view which shows the switching knob of a supporting member.

Then, as shown in FIG. 9, the arrangement is made to switch the supporting member 31 by means of the switching knob 2a between the electric drive and manual operation. The switching knob 2a is integrally formed with an eccentric cam 51. The eccentric cam 51 is arranged in the interior of the hole 53 of a sliding plate 52. The sliding plate 52 is supported by supporting plates 54 and 55, and biased to the supporting member 31 side by means of a flat spring 56. For the sliding plate 52, a triangle-toothed gear, a knurled gear, or some other simple gear 52a is installed to engage with the tooth 31a of the supporting member 31.

Now, referring to FIG. 5, the elastic member 32 biases the ring type thin plate member 33 by the application of an even and reasonable power so that this member is in contact with the inner circumferential surface of the operation ring 5. Here, the material, such as sponge rubber, which has good resistance to aged deterioration with excellent oil resistance, and is also capable of absorbing the irregularities of the sliding surface, is used for the elastic member 32.

Also, the thin plate member 33 is formed by metal, synthetic resin or the like having a thickness of preferably 0.05 to 0.15 mm, and its size is made such as to enable the outer circumference thereof to slightly abut upon the inner circumferential surface of the friction ring 35. If the friction ring 35 should be off-positioned from the thin plate member 33, the corner portion of the friction ring 35 may be hooked by the thin plate member 33. In order to avoid this hooking, an edge portion of the thin plate 33 is partly rounded, and the friction ring 35 is chamfered simultaneously. The elastic member 32 and the thin plate member 33 are installed on the supporting member 31 after its convex posture has been adjusted by means of a jig or the like.

Further, between the thin plate member 33 and the friction ring 35, newton fluid, such as grease, having an appropriate viscosity is installed to apply a desired load on the operation ring 5. The portion that gives a first load to the operation ring 5 is formed by the thin plate member 33, the friction ring 35, and grease. In this respect, grease generates viscous resistance to install the smooth stability for the operation ring 5 without any sense of hooking, rolling, slipping, or the like, and at the same time, it is arranged to apply loads so that a sense of lightness is given at the time of slower rotation, while a sense of heaviness is given at the time of faster rotation.

In this respect, the reasons why the thin plate member 33 and the friction ring 35 are arranged to be evenly and slightly in contact with each other are that if an excessive gap is given between the thin plate member 33 and the friction member 35 so as not to allow them to be in contact, slippage may take place when handling the operation ring 5 or the handling sense becomes extremely unfavorable, and that if, on the contrary, the outer diameter of the thin plate member 33 is made larger than the inner diameter of the friction ring 25 so as to allow it to be in contact with the friction ring intensively, sliding resistance is created by friction in addition to the viscous resistance of grease, hence making sliding resistance stronger in some cases, with a fear that dryness may be sensed when handling the operation ring.

By the structure described above, at first, if the operation ring 5 is driven electrically, a switching lever (not shown) and the switching knob 2a are set for the use of electric drive (see FIG. 2). Then, the switching lever thus set causes the clutching plate 9 (see FIG. 3) to rotate to the right so that the intermediate gear 8 engages with the output gear 11. Also, the switching knob 2a thus set causes the eccentric cam 51 to rotate to release the engagement between the simple gear 52a of the sliding plate 52 and the gear 31a of the supporting member 31. In this way, the driving power from the driving motor 13 can be transmitted to the operation ring 5 to make the supporting member 31 rotatate. At this juncture, the portion between the fixed barrel 3 and the supporting member 31 is assumed to apply a second load on the operation ring 5.

When the driving power of the motor is given to the operation ring 5 in this state, the operation ring 5 and the supporting member 31 are rotated together with respect to the fixed barrel 3, because the sliding resistance, which is the sum of the viscous resistance of grease and friction resistance between the thin plate member 33 and the friction ring 35, that is, the first load, is greater than the second load. In this case, since the load to the operation ring 5 is determined by the sliding resistance between the fixed barrel 3 and the supporting member 31, the operation ring 5 becomes rotative in a condition that it receives only an extremely small sliding resistance constantly. In other words, the rotational barrel 38 can rotate without applying any considerable load on the motor. Also, if the load to the operation ring 5 becomes more than a given amount, the limiter mechanism of the driving unit 2 functions to enable the sleeve 15 to slide with respect to the output gear 11 as in the case of the lens driving system 38 moving to the operation end where it comes to an abrupt stop, for example. In this way, the rotation of the output gear 11 is suspended so as to prevent the teeth 5a and 8a from being damaged.

On the other hand, when the operation ring 5 should be handled manually, the switching lever and the switching knob 2a are set for use in manual operation. The switching lever thus set enables the clutching plate 9 to rotate to the left so that the engagement between the intermediate gear 8 and the output gear 11 is released (see FIG. 4). Also, the switching knob 2a thus set enables the eccentric cam to rotate. Then, the simple gear 52a of the sliding plate 52 and the gear 31a of the supporting member 31 are allowed to engage. In this way, the transmission of the driving power from the driving motor 13 to the operation ring 5 is cut off. At the same time, the rotation of the supporting member 31 is blocked with respect to the fixed barrel 3.

If the operation ring 5 is manually operated in this state, the friction ring 35 rotates together with the operation ring 5. At this juncture, a load is applied on the operation ring 5 due to the size of the contact area between the thin plate member 33 and the friction ring 35, as well as the magnitude of the viscous resistance of grease and sliding resistance between them. Therefore, the operator can rotate the operation ring 5 with an appropriate amount of load given to it.

Here, when the load to the operation ring 5 is adjusted, the cover 40 is removed from the operation ring 5, and the lock is released. Then, the adjusting pin 36 is made shiftable in the direction toward the "LIGHT" position or the "HEAVY" position. The friction ring 35 shifts in the optical axis direction along the feed screw 39 (as indicated by arrows in FIG. 5). Hence, the contact area between the thin plate member 33 and the friction ring 35 changes. In proportion to the changes of the contact area, the viscous resistance of grease and the sliding resistance change to apply a load on the operation ring 5 as desired. At this juncture, the adjustment pin 36 should be positioned, and the cover 40 is installed on the operation ring 5. Then, the adjustment pin 36 is pushed in the nearest round groove 42*a* to fix the adjustment pin 36.

As described above, in accordance with the present embodiment, the friction ring 35 is caused to move with respect to the thin plate member 33, thereby giving a load on the operation ring 5 as desired. Therefore, it becomes possible for the operator himself to adjust the load given to the operation ring 5 as he desires depending on the object of photography, phototaking environment, or the like. Also, the load applied on the operation ring 5 is minimized when electrically driven. Therefore, the rotational speed of the operation ring 5 can be increased, while reducing the amount of power dissipation.

Also, the contact area between the thin plate member 33 and the friction ring 25 changes while the friction ring 35 is rotating. Therefore, it becomes possible to prevent slippage or shortage of grease, among some other defective provision thereof. Also, since the thin plate member 33 is closely in contact with the friction ring 35, it is possible to apply a desired load on the operation ring 5 immediately after the friction ring has moved. Also, the thin plate member 33 is naturally in contact with the friction ring 35. Therefore, it is possible to prevent the occurrence of any abrupt movement when the operation is actuated, and at the same time, to enable the friction ring 35 to follow the thin plate member 33 in good condition when the direction of rotation is reversed. Further, since the friction ring 35 is arranged on the inner side of the operation ring 5, the unit can be fabricated compactly to remove the backlash and abrupt movement of the power transmission mechanism of the driving unit 2, and other unfavorable influences as well.

Here, the cover 40 is also installed for the operation ring 5, making it possible to prevent dust particles, water droplets, or the like from adhering to the feed screw 39 and others in the cover 40. Also, with the pin lock member 42 which is arranged for the cover 40, it becomes possible to automatically lock the adjustment pin 36 when the cover 40 is installed. Also, the adjustment pin 36 is made shiftable just by removing the cover 40. This arrangement makes it easy to adjust the load to be applied on the operation ring 5, while eliminating any errors in making the adjustment. Further, the first load between the thin plate member 33 and the friction ring 35 is set to be greater than the second load between the fixed barrel 3 and the supporting member 31. Therefore, the operation ring 5 can be rotated smoothly with the provision of an appropriate load having the sense of grease being present at the time of manual operation.

In this respect, the operation ring 5 and the friction ring 35 are connected by means of the helicoid type feed screw. However, it may be possible to use a cam or the like. Also, for fixing the adjustment pin 36, the pin locking member 42 is used. However, it may be possible to make the arrangement so that rubber or some other elastic member is fixed to the cover 40 in order to press the adjustment pin 36 by means of such elastic member only when the cover 40 is installed. Also, interlocked with the operation of the switching knob 2*a*, the driving system and the sliding plate 52 are made switchable. With this arrangement, not only the operation is facilitated, but also, errors are prevented in executing the operation.

Figure 10:
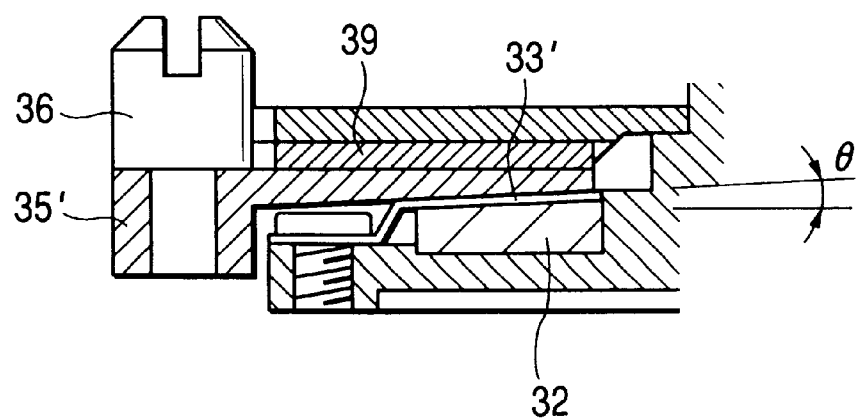
FIG. 10 is a cross-sectional view which shows the state where one variational example of the friction ring is installed.

Also, if the load cannot be applied on the operation ring 5 as desired only by means of the viscous resistance of grease, it is possible to install a load greater than that one for the operation ring 5 by providing a slight taper θ for the contact surface between the thin plate member 33' and the friction ring 35' as shown in FIG. 10. In this case, the structure is arranged so that the outer diameter of the thin plate member 33' may become greater than the inner diameter of the friction ring 35' gradually from the state where the thin plate member 33' does not abut upon the friction ring 35', and then, the friction resistance resulting from the compression force is added to the viscous resistance of grease. In this way, it becomes possible to shift the setting of load from the "LIGHT" position to the "HEAVY" position without a sense of incompatibility.

Here, the loads can be set as desired for the operation ring 5 of a handy lens for use of television camera. However, this invention is also applicable to the load adjustment mechanism that may be adoptable for the one-axis two-operation zooming lens, such as adopted for a larger lens of television camera, which is disclosed in the specification of Japanese Patent Laid-Open Application No. 7-310769 regarding a brake mechanism, control mechanism, operational force adjustment device, and optical barrel.

As described above, for the optical barrel of the present invention, a load adjustment mechanism is installed for adjusting the loads to be applied on the operational member. Therefore, by adjusting the load to be smaller, it is possible to enhance the rotational speed of the operational member. Also, by adjusting the load appropriately, it is possible to make the operational member functional as desired by the operator depending on the object to be phototaken, phototaking environment, and the like.

Now, with reference to FIG. 11 to FIG. 20, the description will be made of the embodiments in accordance with the present invention.

Figure 11:
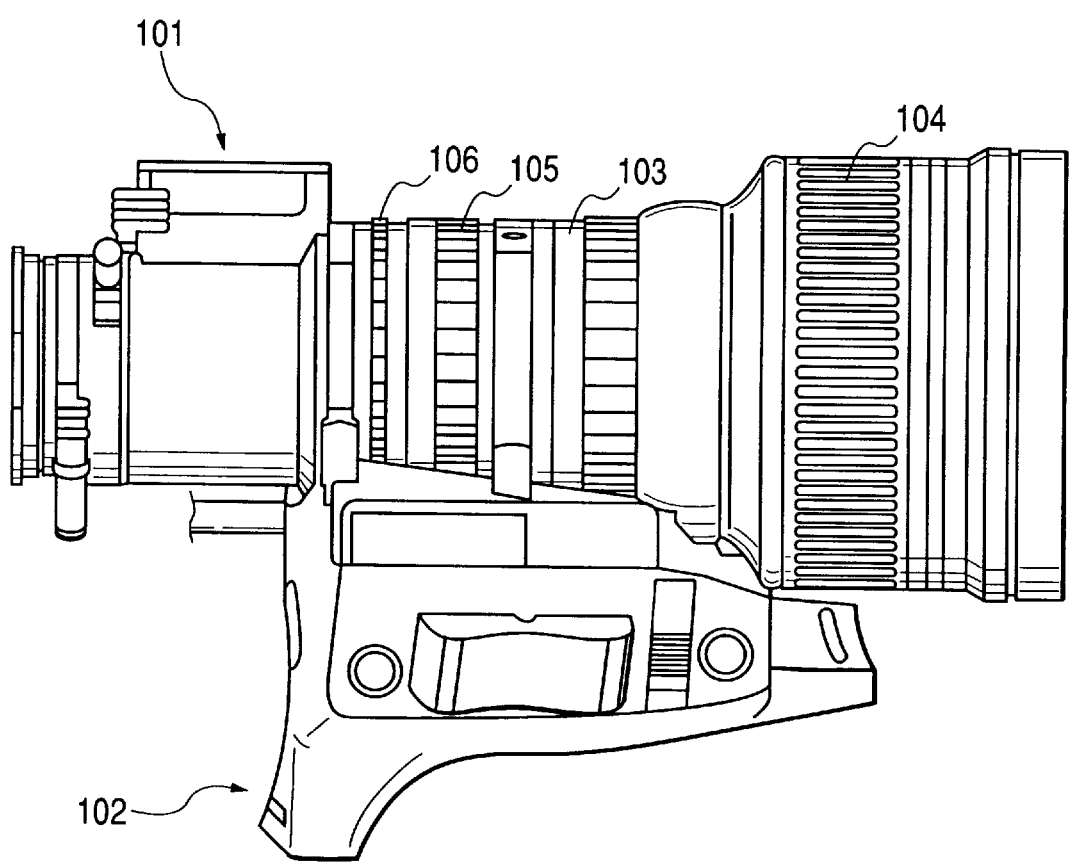
FIG. 11 is a partially cut off side view which shows a lens barrel embodying the present invention.
Figure 12:
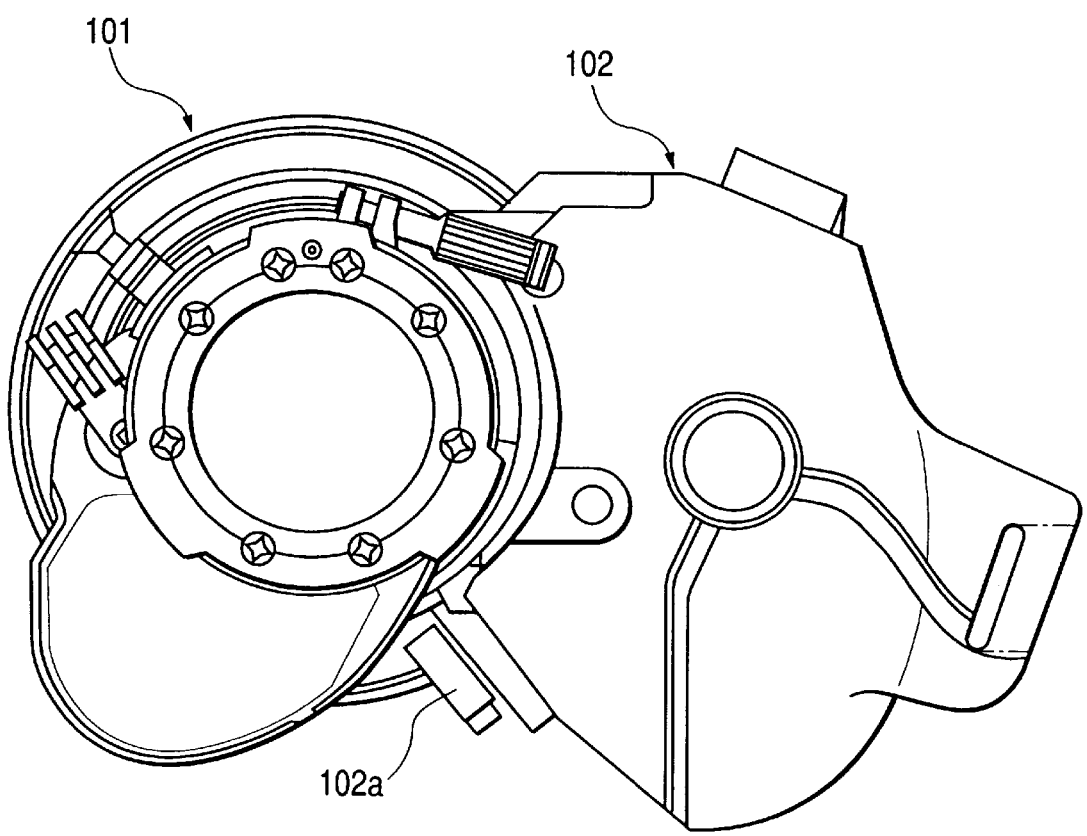
FIG. 12 is a rear view which shows the lens barrel shown in FIG. 1.

FIG. 11 is a partial side view showing a lens barrel embodying the present invention. FIG. 12 is a rear view thereof, in which the optical barrel is arranged for use with a phototaking lens 101 installed on an optical apparatus, such as a television camera, and also, a driving unit 102 is installed for the phototaking lens 101. In the fixed barrel 103 of the phototaking lens 101, there are arranged a focus lens, a zoom lens, an iris, and the like (not shown), which share one optical axis. On the outer circumference of the fixed barrel 103, substantially cylindrical operation rings 104, 105, and 106 are rotatively arranged in order to operate the focus lens, the zoom lens, the iris, and some others, respectively.

Figure 13:
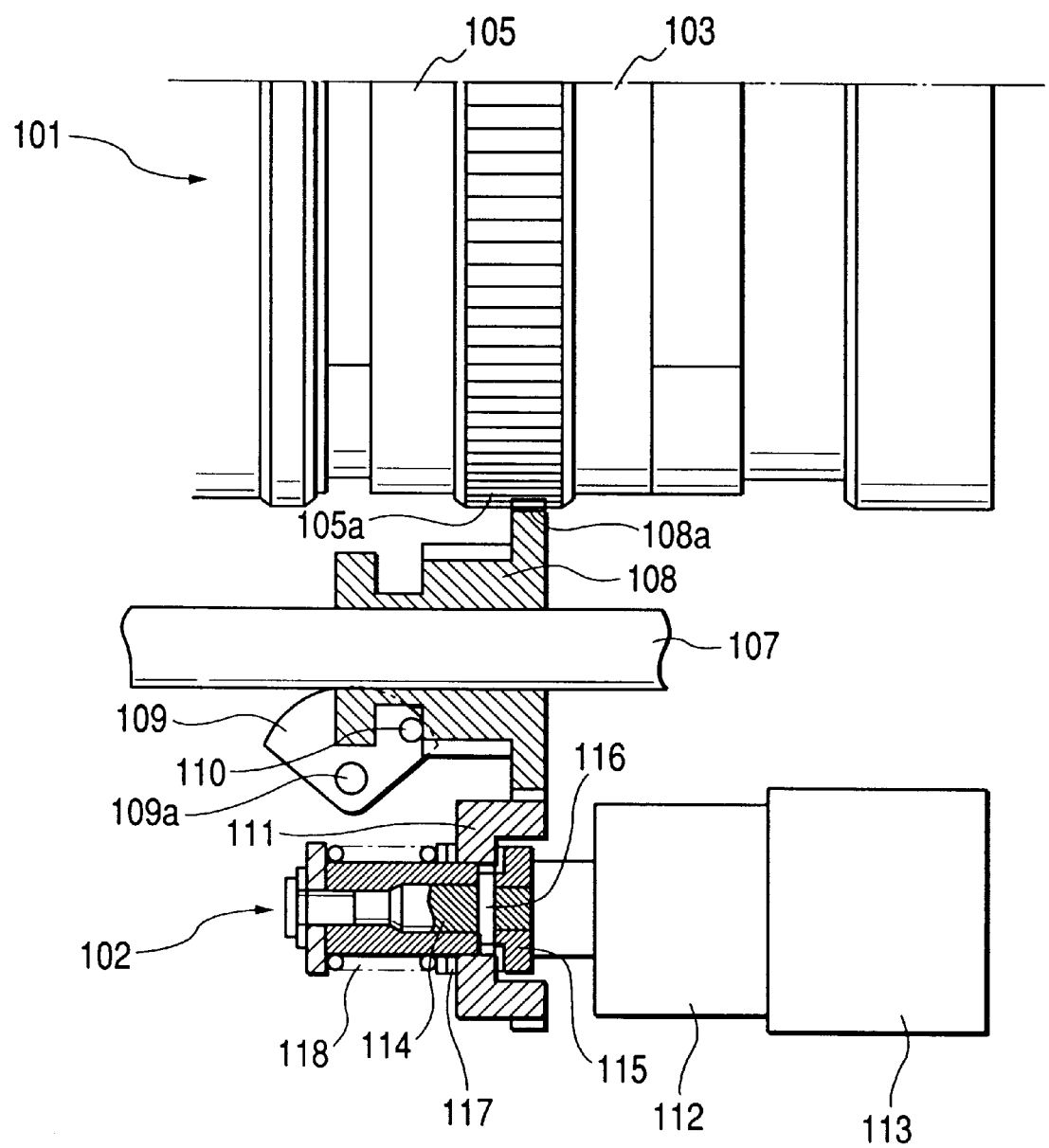
FIG. 13 is a partially sectional view which shows a driving unit.

The driving unit 102 is constituted so as to drive the operation ring 105, for example. For the driving unit 102, an operational member 102*a* is arranged to operate the operation ring 5. As shown in FIG. 13 which is a partially cross-sectional-view, the intermediate gear 108 is slidably and rotatably supported on the fixed shaft 7. The tooth 108*a* of the intermediate gear 108 is arranged to mesh freely with the tooth 105*a* of the operation ring 105. With the intermediate gear 108, the pin 110 of a clutch plate 109 engages to cause the intermediate gear 108 to shift forward and backward by the rotation of the clutch plate 109. Then, the structure is arranged so that interlocked with a switching knob, which will be described later, the clutch plate 109 is driven.

An output gear 111 is meshed with the intermediate gear 108. The output gear 111 is connected with a driving motor 113 by way of transmitting means 112. In this case, a sleeve 115 is fixed by a pin 116 to the output shaft 114 of the transmitting means 12. The output gear 111 is rotatably mounted on the sleeve 115. Then, the sleeve 115 is biased by a spring 118 toward the driving motor 113 side by way of a sliding washer 117. In this way, a torque limiter is constituted. If a zoom lens does not move any longer at the zooming end and the load given to the operation ring 105 becomes excessive, the driving power of the driving motor 113, which is transmitted to the operation ring 105, is restricted, while the sleeve 115 is being rotated idly with respect to the output gear 111.

Figure 14:
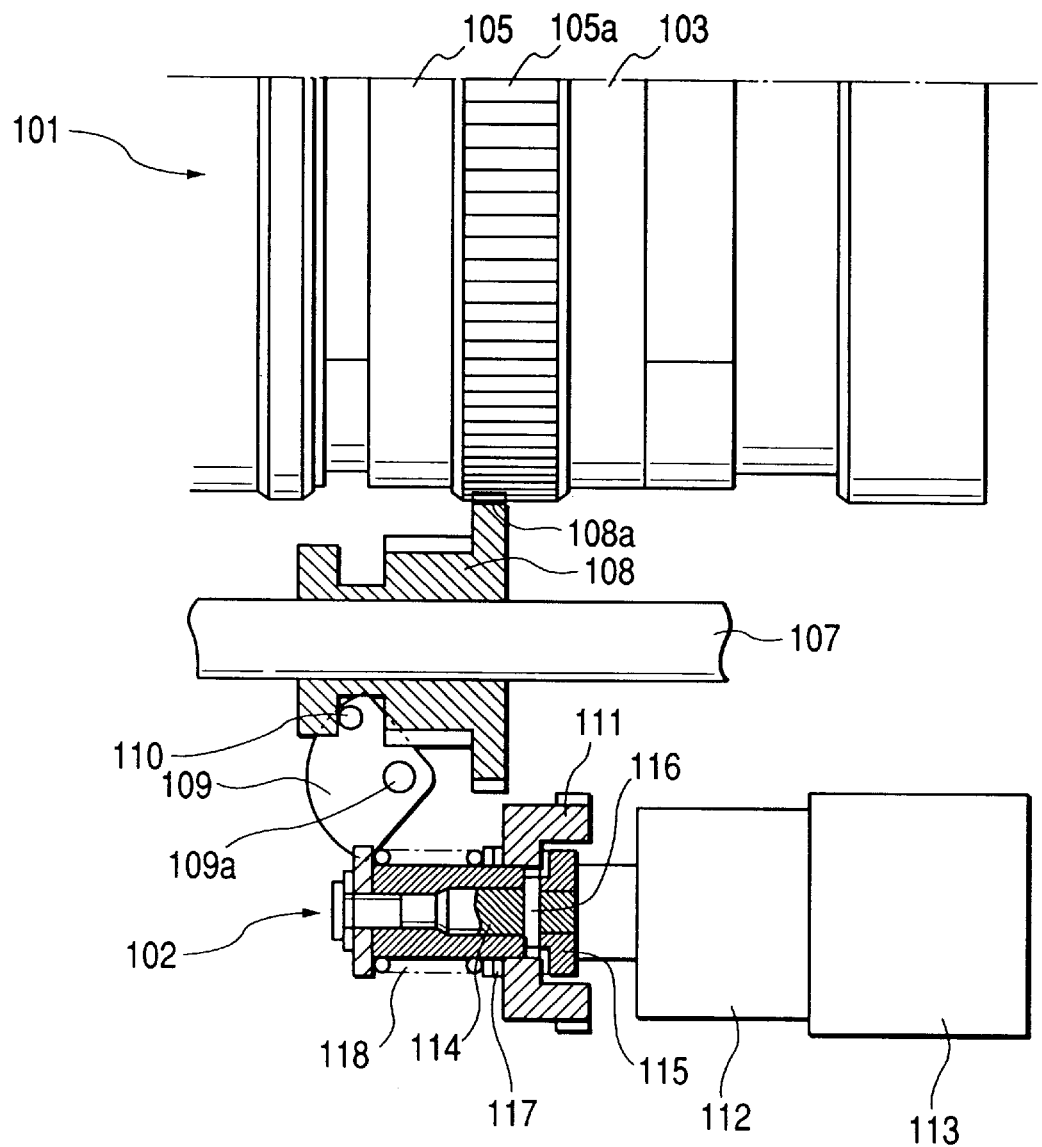
FIG. 14 is a view which illustrates operation of the driving unit.

Also, when the operation ring 105 is electrically driven, the intermediate gear 108 is allowed to shift to be in the state described above. If the operation ring 105 should be manually operated, the clutch plate 109 is rotated around the axis 109a to release the engagement between the intermediate gear 108 and the output gear 111 as shown in FIG. 14, hence interrupting the transmission of the driving power from the driving motor 113 to the operation ring 105.

Figure 15:
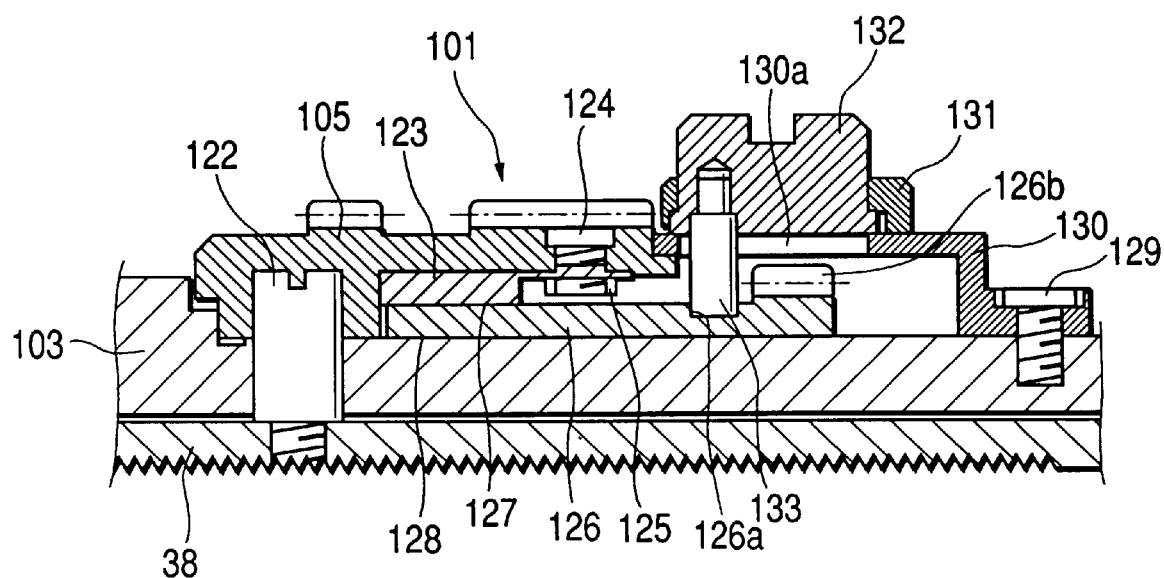
FIG. 15 is a partial enlargement of a vertically sectional view of the driving unit.
Figure 16:
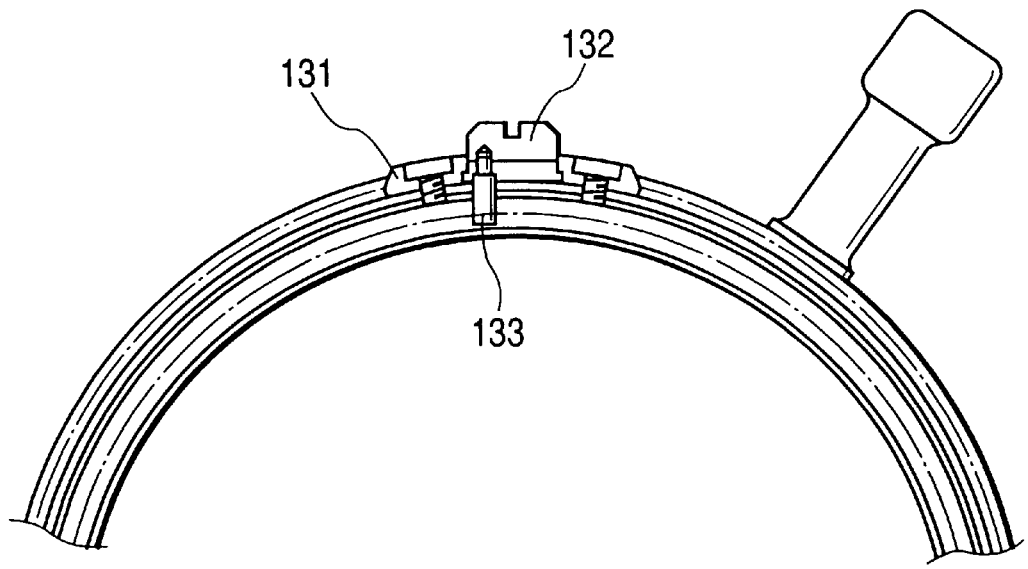
FIG. 16 is a partial enlargement of a horizontally sectional view of the driving unit.
Figure 17:
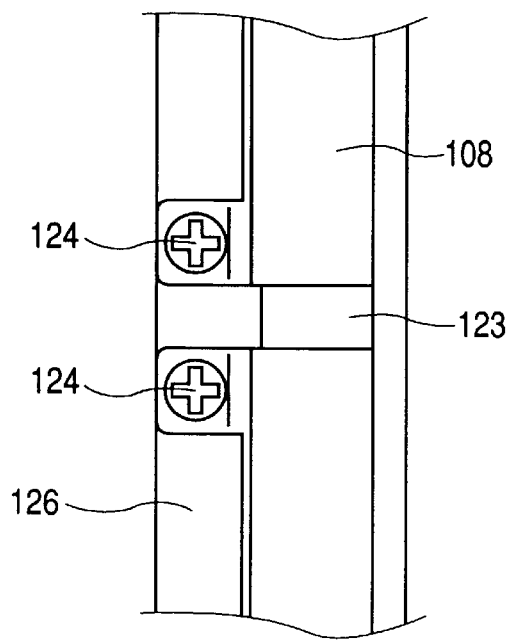
FIG. 17 is a partial enlargement of a front view thereof.

Here, as shown in FIG. 15 which is a partial enlargement of a vertically sectional view, FIG. 16 which is a partial enlargement of a horizontally sectional view, and FIG. 17 which is a partial enlargement of a plan view, respectively, there is arranged a lens driving system 38 installed with a zoom lens in the fixed barrel 103. This lens driving system 38 is connected with the operation ring 105 by way of a pin 122. On the inner circumferential surface of the operation ring 105, a substantially cylindrical elastic member 123 is fixed by means of a fastener, bonding adhesion or the like. The elastic member 123 is fixed to the operation ring 105 after its convex posture is adjusted by means of a jig or the like.

On the outer circumference of the fixed barrel 103 on the inner circumferential surface side of the elastic member 123, a substantially cylindrical load application member 126 is arranged to be displaceable in the circumferential direction and the optical axis direction. The load application member 126 is switchable by means of the switching knob, which will be described later, to make the electric operation or the manual operation possible. In this respect, the structure is arranged so that this member is displaceable in the state that the electric operation is made executable, but it is fixed to the fixed barrel 103 in the state of the manual operation.

The inner circumferential surface of the elastic member 123 and the slidable contact portion 127 of the outer circumferential surface of the load application member 126 is pressed to be in contact by means of grease or some other viscous fluid. The slidable contact portion 127 is thus arranged to generate sliding resistance. Also, the sliding resistance of the slidable contact portion 127 is made greater than the sliding resistance of the slidable contact portion 128 between the load application member 126 and the fixed barrel 103.

Figure 18:
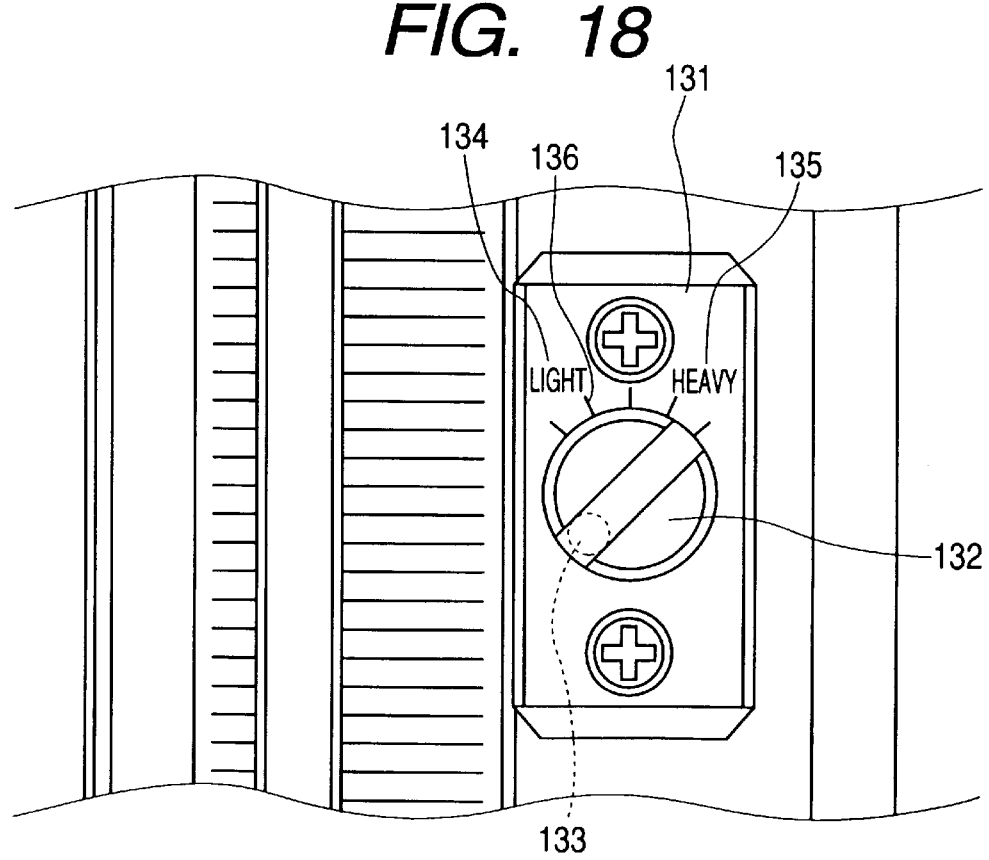
FIG. 18 is a partial enlargement of a front view which shows a load adjustment knob and the portion in the vicinity thereof.

The operation ring 105, which is installed with load by means of the load application member 126 thus arranged, is biased by the fixed ring 130 fixed to the fixed barrel 103 by means of a screw 129. As a result, the operation ring 105 is made rotatable without any backlash. Then, as shown in FIG. 18 which is a partial plan view, the supporting member 131 is arranged on the outer circumference of the fixed ring 130. For the supporting member 131, a load adjustment knob 132 is installed.

On the bottom surface of the load adjustment knob 132, a pin 133 is installed. The pin 133 is fitted into the groove 126a of the load application member 126 through the circularly elongated hole 130a drilled through the fixed ring 130. The pin 133 is positioned to be eccentric to the load adjustment knob 132. When the load adjustment knob 132 is rotated, the pin 133 shifts in the optical axis direction to drive the load application member 126 also in the optical axis direction. The arrangement is thus made so as to change the area of the slidable contact portion 127 between the elastic member 123 and the load application member 126.

Also, to the surface of the supporting member 131 in the circumference of the load adjustment knob 132, a label 134 marking "LIGHT" is affixed to indicate that the load to be applied on the operation ring 105 is lighter, and a label 135 marking "HEAVY" is also affixed to indicate that the load to be applied thereon is heavier. Here, calibrations 136 are installed to divide the portion between these labels 134 and 135.

The calibrations 136 serve an index of the degree of each load given to the operation ring 105. When the load adjustment knob 132 rotates in the direction toward the "LIGHT", the area of the slidable contact portion 127 is decreased to reduce the load given to the operation ring 105. When the load adjustment knob 132 rotates in the direction toward "HEAVY", the area of the slidable contact portion 127 is increased. The load given to the operation ring 105 is increased accordingly.

Figure 19:
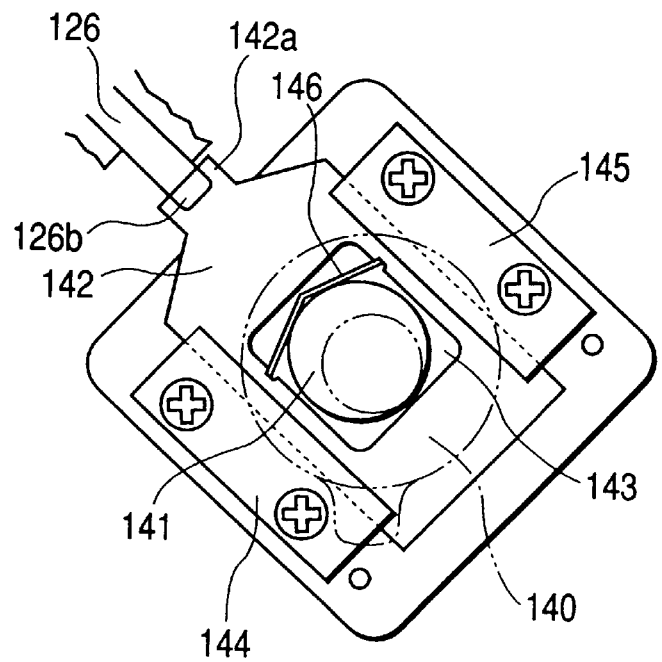
FIG. 19 is a view which schematically shows a switching knob.

Then, as schematically shown in FIG. 19, the arrangement is made to change the load application member 126 by means of the switching knob 140 over the electric drive or manual operation. The switching knob 140 is integrally formed with an eccentric cam 141. The eccentric cam 141 is arranged in the interior of the hole 143 of a sliding plate 142. The sliding plate 142 is slidably supported by supporting plates 144 and 145, and biased onto the load application member 126 side by means of a flat spring 146 both ends of which are fixed to the sliding plate 142. For the sliding plate 142, a triangle-toothed gear, a knurled gear, or some other simple gear 14a, for example, is arranged to mesh with the tooth 126b of the load application member 126.

Here, the material, such as sponge rubber, which exerts even and reasonable elasticity, and installs good resistance to age deterioration with excellent oil resistance, and which is also capable of absorbing the irregularities of the sliding surface, is used for the elastic member 132 to enable it to be in contact with the load application member 126 with such even and reasonable elasticity.

Also, grease is applied between the elastic member 123 and the load application member 126, such as viscous fluid having an appropriate viscosity to install the smooth stability for the operation ring 105 without any sense of hooking, rolling, slipping, or the like, and at the same time, it is arranged to apply loads so that a sense of lightness is given at the time of slower rotation, while a sense of heaviness is given at the time of faster rotation. Then, the arrangement is made to apply a first load on the operation ring 105 by means of the elastic member 123, load application member 126, and grease corresponding to an area of the slidable contact portion 127 between the elastic member 123 and the load application member 126. On the other hand, a second extremely little load is applied on the slidable contact portion 128 between the fixed barrel 103 and the load application member 126.

In this respect, if a gap is provided between the elastic member 123 and the load application member 126 so as not to allow them to be in contact, slippage may take place when handling the operation ring 105 or the handling sense becomes extremely unfavorable. If, on the contrary, the inner diameter of the elastic member 123 is made smaller than the outer diameter of the load application member 126 so as to allow them to be in contact intensively, sliding resistance is created by friction in addition to the viscous resistance of grease, hence making friction resistance stronger in some cases, with a fear that dryness may be sensed when handling the operation ring. Therefore, it is necessary to enable the elastic member 123 and the load application member 126 to be in contact evenly and lightly.

When the operation ring 105 of the optical barrel thus arranged is driven electrically, the switching knob 140 is changed over for the use of electric drive. Then, the clutching plate 109 of the driving unit 102 is caused to rotate to the right so that the intermediate gear 108 moves and the teeth thereof are meshed with the tooth 105a of the operation ring 105. Here, the eccentric cam 141 rotates, and the sliding plate 142 moves, thus releasing the engagement between the simple gear 142a and the tooth 126b of the load application member 126. In this way, the driving power of the driving motor 113 can be transmitted to the operation ring 105 to cause the load application member 126 to rotate. At this juncture, the extremely small second load is applied at the slidable contact portion 128 between the fixed barrel 103 and the load application member 126.

When the driving power of the driving motor 113 is transmitted to the operation ring 105 in this state, the operation ring 105 and the load application member 126 rotate together with respect to the fixed barrel 103, because the first load applied on the slidable contact portion 127 between the elastic member 123 and the load application member 126 is greater than the second load applied on the slidable contact portion 128 between the fixed barrel 103 and the load application member 126. In this case, since the load given to the operation ring 105 has become the second one, the operation ring 105 can rotate in condition that it receives only an extremely small sliding resistance constantly. Thus, there is no possibility a large load is applied to the driving motor 113.

Also, if the load to the operation ring 105 becomes more than a given amount, as in the case where the lens driving system 121 has arrived at the operation end, for example, the torque limiter mechanism of the driving unit 102 functions to enable the sleeve 115 to slide with respect to the output gear 111. In this way, the tooth 105a of the operation ring 105 and the tooth 108a of the intermediate gear 108 are prevented from being damaged.

On the other hand, when the operation ring 105 should be handled manually, the switching knob 140 is changed over for use in manual operation. Thereby, the clutching plate 109 of the driving unit 102 rotates toward the left so that the engagement between the tooth 108a of the intermediate gear 108 and the tooth 105a of the operation ring 105 is released. Also, the eccentric cam 141 rotates. Then, the simple gear 142a of the sliding plate 142 engages with the tooth 126b of the load application member 126. In this way, the transmission of the driving power is interrupted between the driving motor 113 and the operation ring 105. At the same time, the rotation of the load application member 126 is suspended with respect to the fixed barrel 103.

If the operation ring 105 is handled manually in this state, the operation ring 105 rotates by means of the first load applied on the slidable contact portion 127 between the elastic member 123 and the load application member 126. At this juncture, if the load adjustment knob 32 rotates in between the "LIGHT" indication label 134 and the "HEAVY" indication label 135, the load application member 126 moves in the optical axis direction to cause the area of the slidable contact portion 127 between the elastic member 123 and the load application member 126 to be increased or decreased, and also, the viscous resistance of grease is caused to change corresponding to the changes of area of the slidable contact portion 127. Hence, the load applied on the operation ring 105 increases or decreases.

As described above, in accordance with the first embodiment, the load application member 126 is installed between the fixed barrel 103 and the operation ring 105 in such a manner that the load application member 126 can be displaced, being in contact with both the fixed barrel 103 and the operation ring 105. At the same time, the elastic member 123 is arranged on the inner circumferential surface of the operation ring 105 to be in contact with the load application member 126. The siding resistance of the slidable contact portion 127 between the elastic member 123 and the load application member 127 is made greater than the sliding resistance of the slidable contact portion 128 between the fixed barrel 103 and the load application member 126. Therefore, if the load application member 126 is displaced in the optical axis direction to change the area of the slidable contact portion 127, the load to be applied on the operation ring 105 can be set as desired. As a result, it becomes possible for an operator himself to adjust the load given to the operation ring 105 as he desires depending on the object of photography, the phototaking environment, or the like. Also, at the time of electric operation, the load given to the operation ring 105 is applied only by an extremely small and constant sliding resistance of the slidable contact portion 128. Therefore, the rotational speed of the operation ring 105 can be improved, while reducing the amount of power dissipation of the driving motor 113.

Further, since the elastic member 123 is closely in contact with the load application member 126, it is possible to apply a desired load on the operation ring 105 immediately after the load application member 126 is displaced in the optical axis direction. Also, the elastic member 123 and the load application member 126 are naturally in contact with each other. Therefore, it is possible to prevent the occurrence of any abrupt movement when the operation ring 105 is activated. At the same time, the operation ring 105 can follow the elastic member 123 in good condition when the rotation of the operation ring 105 is reversed. Moreover, since it is made possible to switch over the driving motor 113 and the load application member 126 at a time by the operation of the switching knob 140, the operation ring 105 can be handled easily, while preventing any errors in handling it.

In this respect, it may be possible to arrange a clicking mechanism (e.g., a detent) inside the load adjustment knob 132 for the multiple-stage load adjustment in order to install loads in a stepping fashion.

Figure 20:
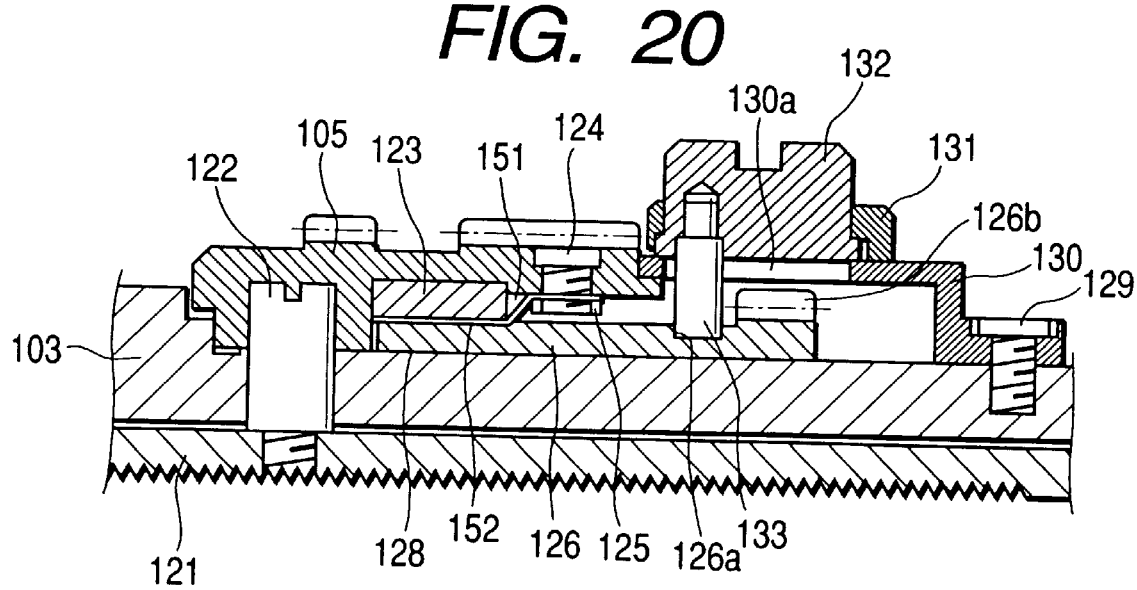
FIG. 20 is a partially enlarged sectional view which shows another embodiment in accordance with the present invention.

FIG. 20 is a partially enlarged sectional view which shows an optical barrel in accordance with a still further embodiment of the present invention. A ring type thin plate member 151 is installed between the elastic member 123 and the load application member 126, which are installed in accordance with the previous embodiment. This thin plate member 151 is slidably in contact with almost the entire area of the outer circumferential surface of the load application member 126. The thin plate member 151 is fixed to the operation ring 105 by means of fastening members 124 and 125. Then, grease is applied to the slidable contact surface 152 between the thin plate member 151 and the load application member 126. A first load is applied to this slidable contact surface 152, by means of a sliding resistance which is the sum of the viscous resistance of grease and the friction resistance.

With the present embodiment, it is possible to obtain a same effect such as the previous embodiment. In addition, with the provision of the thin plate member 151, it becomes possible to select the material and configuration which are most suitable for the functional execution of the compression generating portion and slidable contact portion 152, hence enhancing the capability and durability in this respect.

Here, in accordance with the embodiment described above, the elastic member 123 evenly presses the outer circumferential surface of the load application member 126, while the thin plate member 151 is slidably in contact with almost the entire area of the outer circumference of the load application member 126, and then, the elastic member 123 and the thin plate member 151 are arranged on almost the entire zone of the inner circumference of the operation ring 105. However, it may be possible to arbitrarily set the slidable contact area of the elastic member 123 and thin plate member 151 in the circumferential direction. For example, the elastic member 123 and the thin plate member 151 may be divided into several portions in the circumferential direction or the configuration may be arranged so as to press the load application member in a range of angle arbitrarily.

As above-mentioned in an optical barrel of the present invention and an optical apparatus using the optical barrel thereof, an elastic member is installed on the inner circumferential surface side of the operational member as described above, and the optical barrel main body is installed with a load application member that applies loads onto the operational member by being slidable in contact with the elastic member through viscous fluid. Therefore, when the load application member is displaced to change the slidable contact area between the elastic member and the load application member, it becomes possible to change the loads to be applied on the operational member. As a result, the loads given to the operational member can be set in good condition both for manual and electric drive operations, and for the manual operation, the loads to be applied on the operational member can be set by the operator as he desires.

Also, as compared with the conventional structure where an elastic member is fixed on a load application member side, and then, the outer circumferential surface of the elastic member is slidably in contact with the inner circumferential surface of an operational member, the present invention makes it easier to arrange the structure so that viscous fluid can hardly flow around and exude, or produce any other unfavorable effects in this aspect, and to arrange such structure more compactly as well.

Now, with reference to FIG. 21 to FIG. 29, the description will be made more in detail of a further embodiment of the optical barrel and optical apparatus in accordance with the present invention. Here, a phototaking lens is illustrated as an optical barrel, and a television camera is exemplified as an optical apparatus for the present embodiment.

Figure 21:
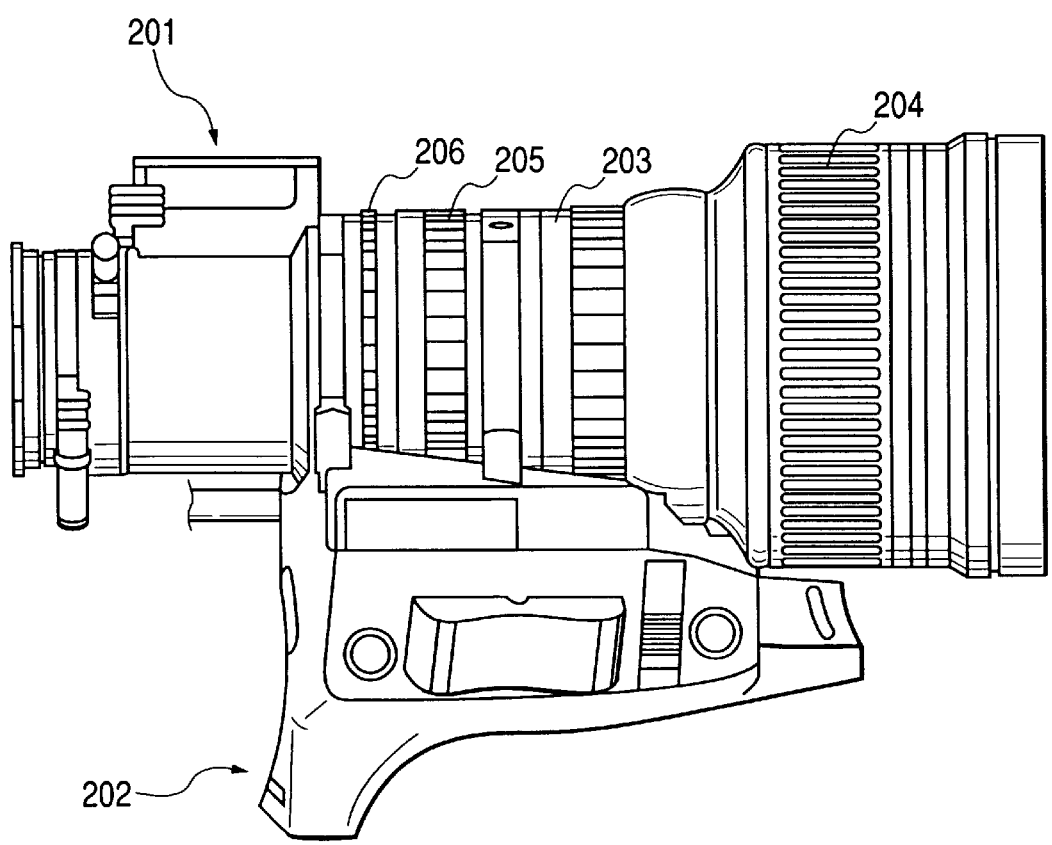
FIG. 21 is a partially side view which shows an optical device embodying the present invention.
Figure 22:
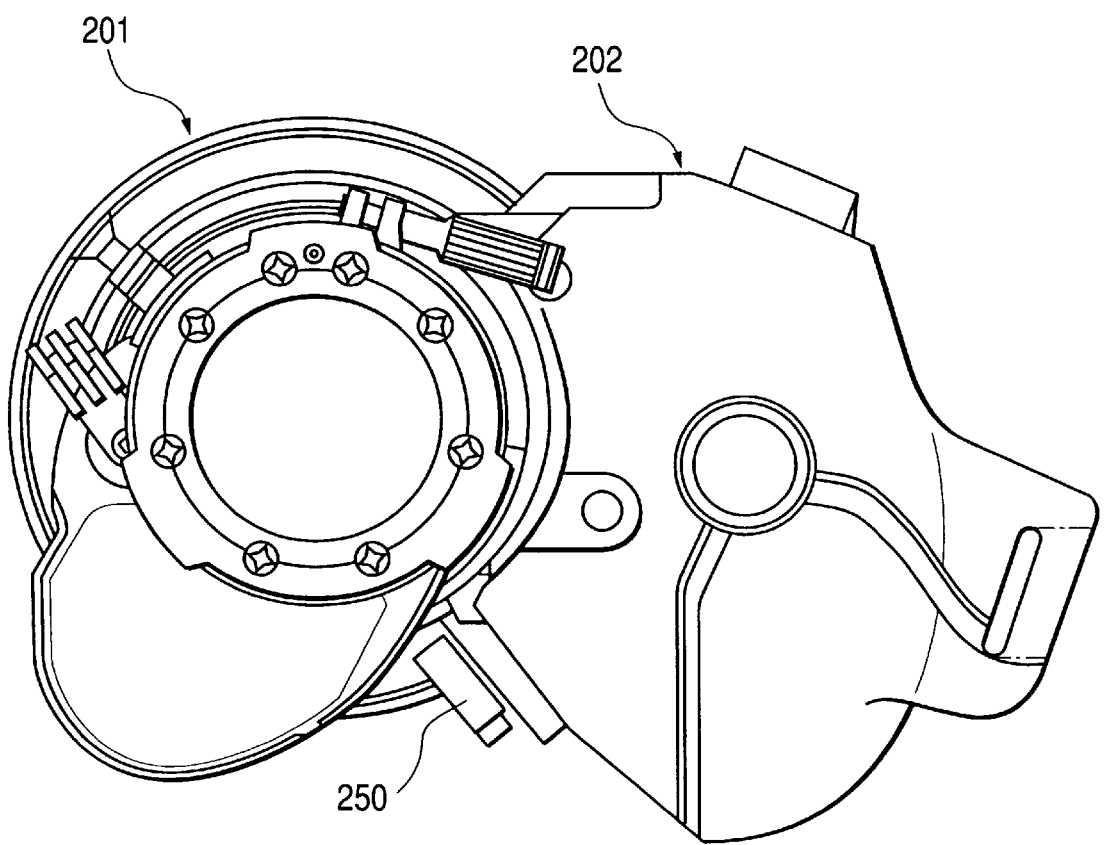
FIG. 22 is a rear view which shows the optical device shown in FIG. 21.

FIG. 21 is a side view which shows the phototaking lens unit of the optical apparatus embodying the present invention. FIG. 22 is a rear view which shows the phototaking lens shown in FIG. 21.

The optical apparatus (television camera) of the present embodiment comprises the television camera main body (not shown) and a phototaking lens 201 and a driving unit 202, which are shown in FIG. 21 and FIG. 22, respectively.

For the fixed barrel 203 which serves as a supporting member that constitutes a part of the barrel of the phototaking lens 201, substantially cylindrical operation rings 204, 205, and 206 are rotatably provided to operate a focus lens, a zoom lens, and an iris, respectively.

The driving unit 202 is structured to electrically drive the operation ring 205 which serves as an operational member for use of the zoom lens, for example. For the driving unit 202, an operational member 202a is installed to electrically operate the operation ring 205 as shown in FIG. 21.

Figure 23:
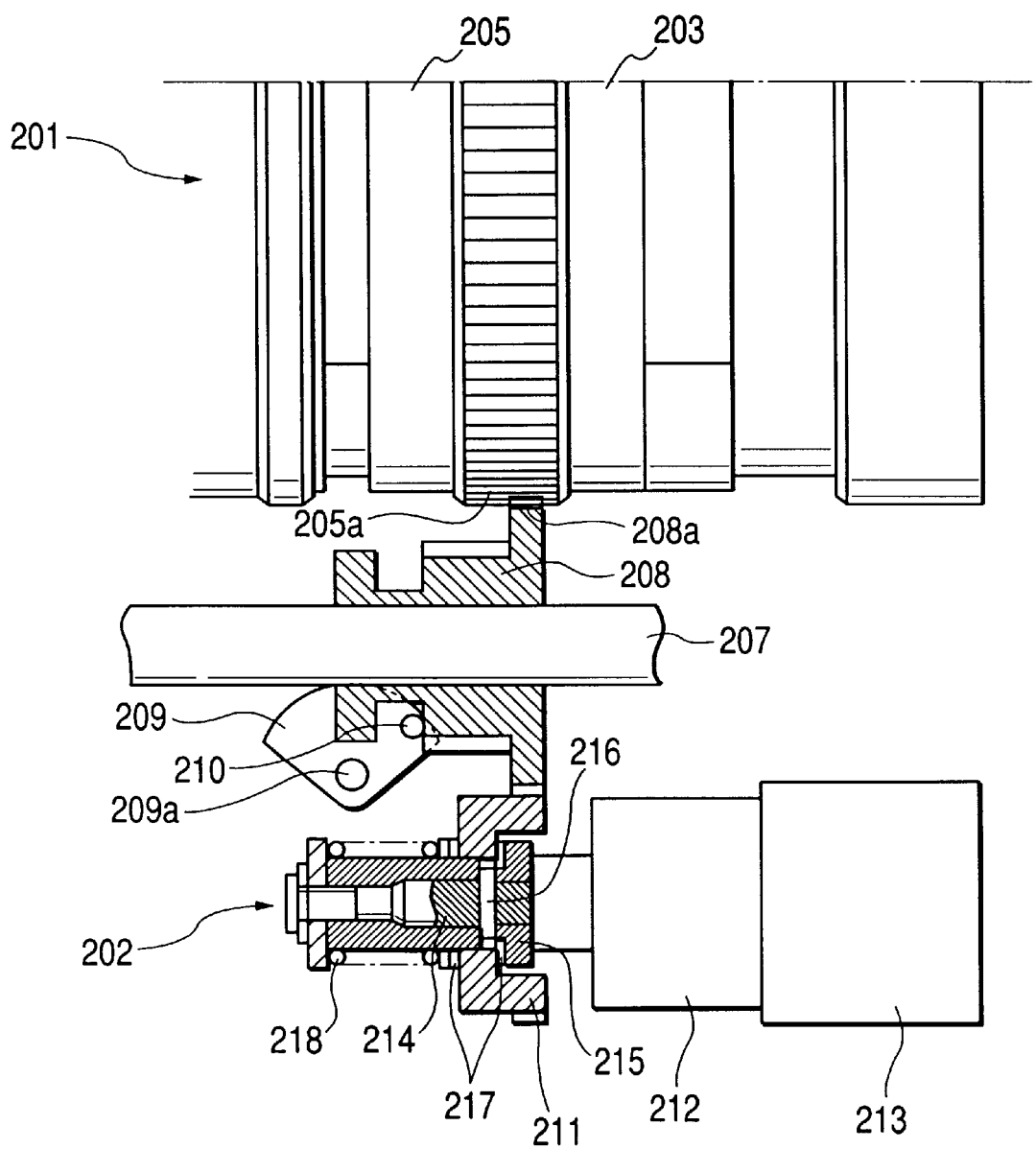
FIG. 23 is a structural view which schematically shows the driving mechanism of the driving unit of the optical device shown in FIG. 21.
Figure 24:
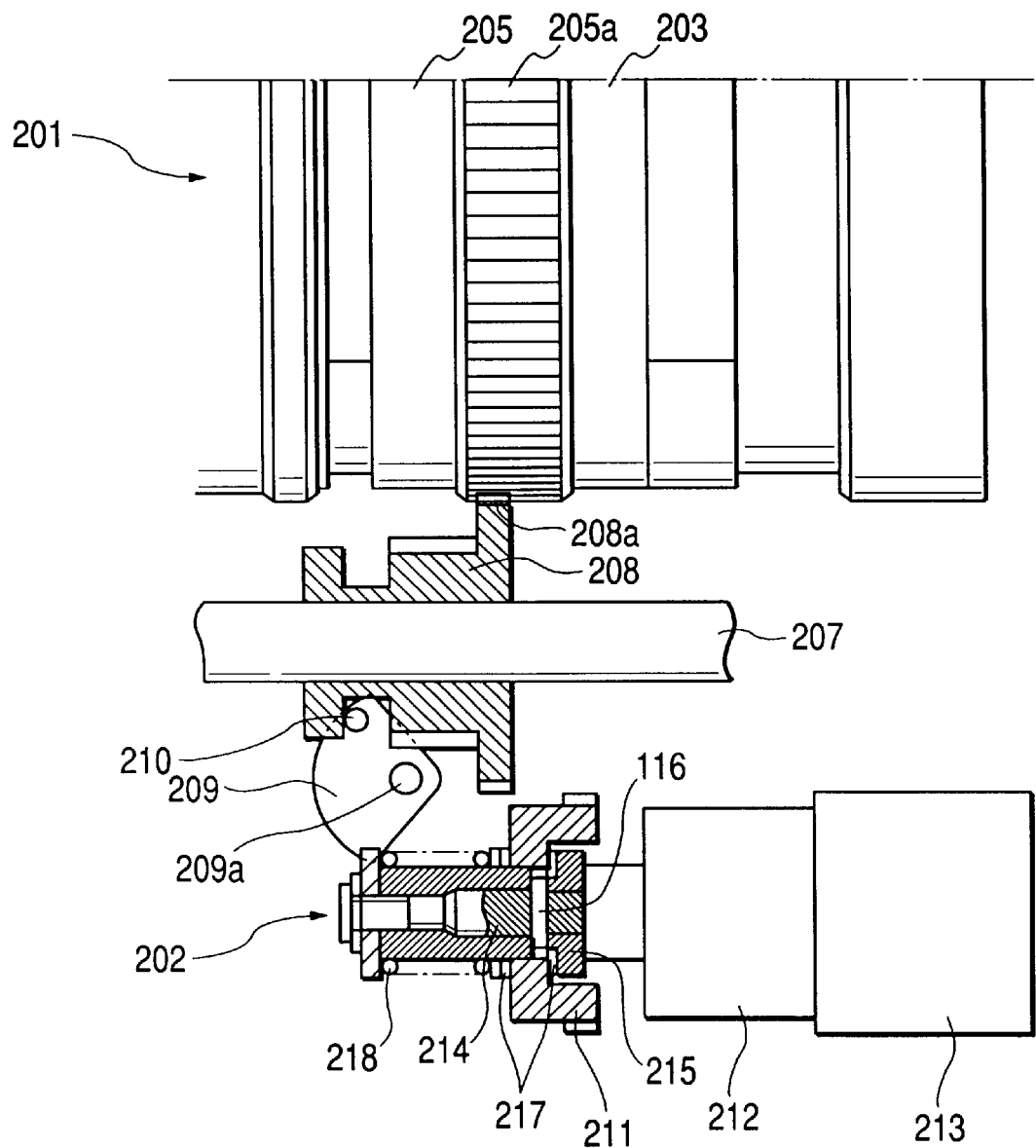
FIG. 24 is a view which illustrates the function of the driving mechanism of the driving unit shown in FIG. 23.

FIG. 23 and FIG. 24 are views which illustrate the driving mechanism of the driving unit of the optical apparatus.

As shown in FIG. 23, the driving unit 202 is installed with a tooth 205a formed on the outer circumference of the operation ring 205. The tooth 208a of the intermediate gear 208 is meshed with this tooth. The intermediate gear forms a part of a transmission changing mechanism slidably supported on a shaft 207. The pin 210 of a clutching plate 209 is engaged with the intermediate gear 208, to move the intermediate gear 208 forward and backward by the rotation of the clutching plate 209. The intermediate gear 208 is meshed with an output gear 211. The output gear 211 is connected with the driving motor (electrical driving means) 213 through transmitting means 212. In this case, a sleeve 215 is fixed by a pin 216 to the output shaft 214 of the transmitting means 212. The output gear 211 is rotatably mounted on the sleeve 215. Further, the sleeve 215 is biased by a spring 218 through a sliding washer 217.

In this way, the output gear 211 is rotatably mounted on the sleeve 215. The sleeve 215 is biased by the spring 218 through the sliding washer 217, thus constituting a torque limiter. If the lens cannot move more than the zooming end, for example, and the load applied on the operation ring 205 becomes excessive, the transmitting driving power is restricted between the driving motor 213 and the operation ring 105. Then, when the operation ring 205 is manually operated, the clutching plate 209 rotates around the shaft 209 as shown in FIG. 24, thus releasing the meshing state between the intermediate gear 208 and the output gear 211.

Figure 25:
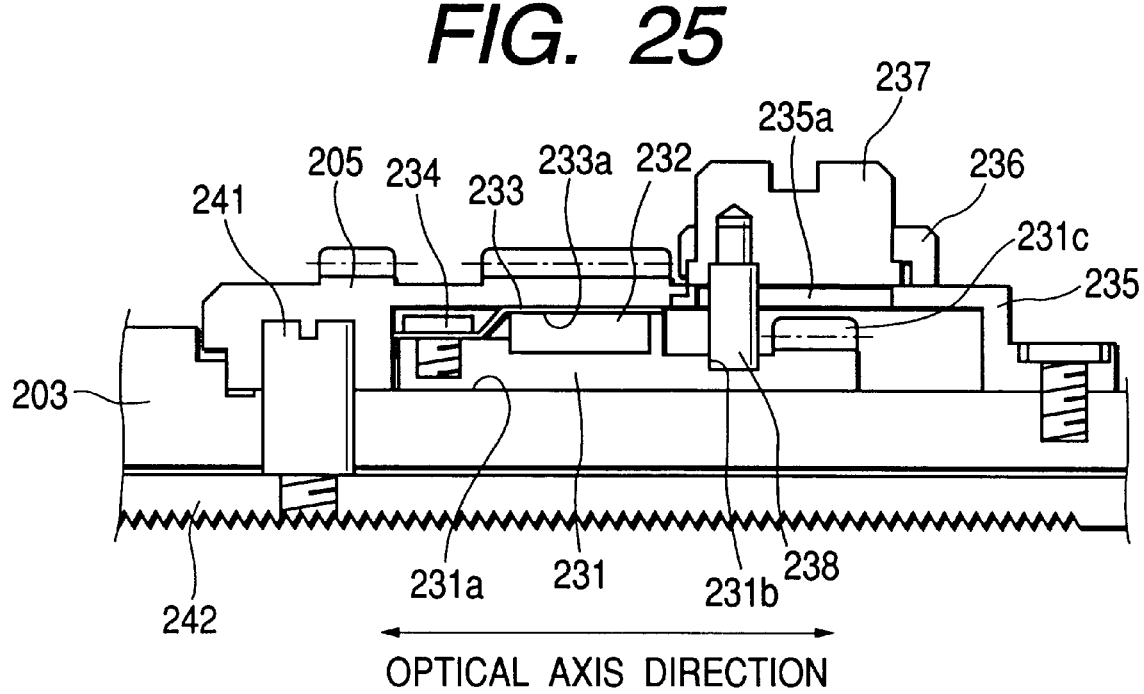
FIG. 25 is a partially sectional view of the optical barrel that shows the relational arrangement of the fixed barrel, operation ring, supporting member, and load adjustment knob of the optical device shown in FIG. 21.
Figure 26:
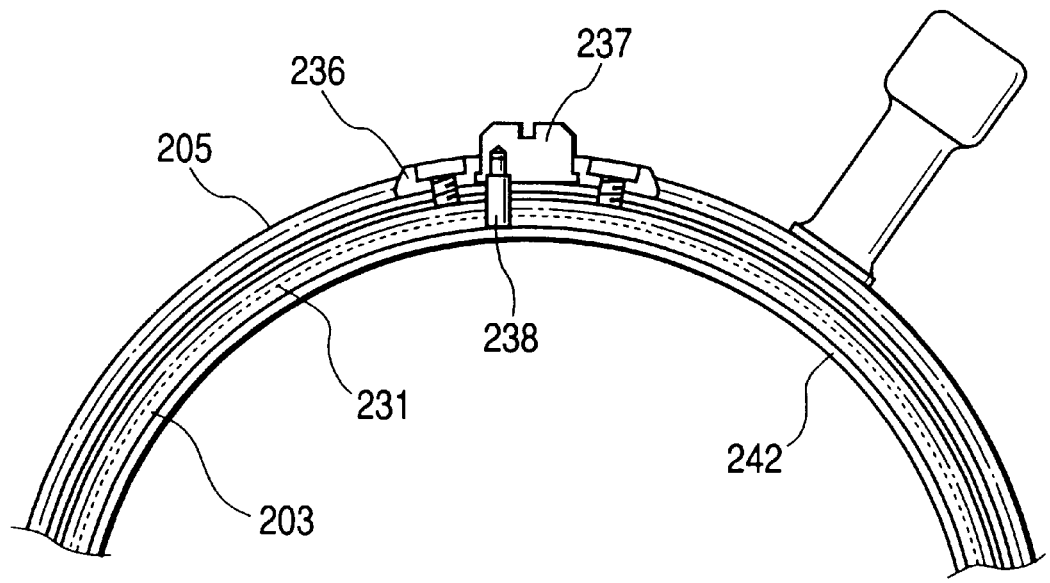
FIG. 26 is a partial front view which shows the optical barrel shown in FIG. 25.
Figure 27:
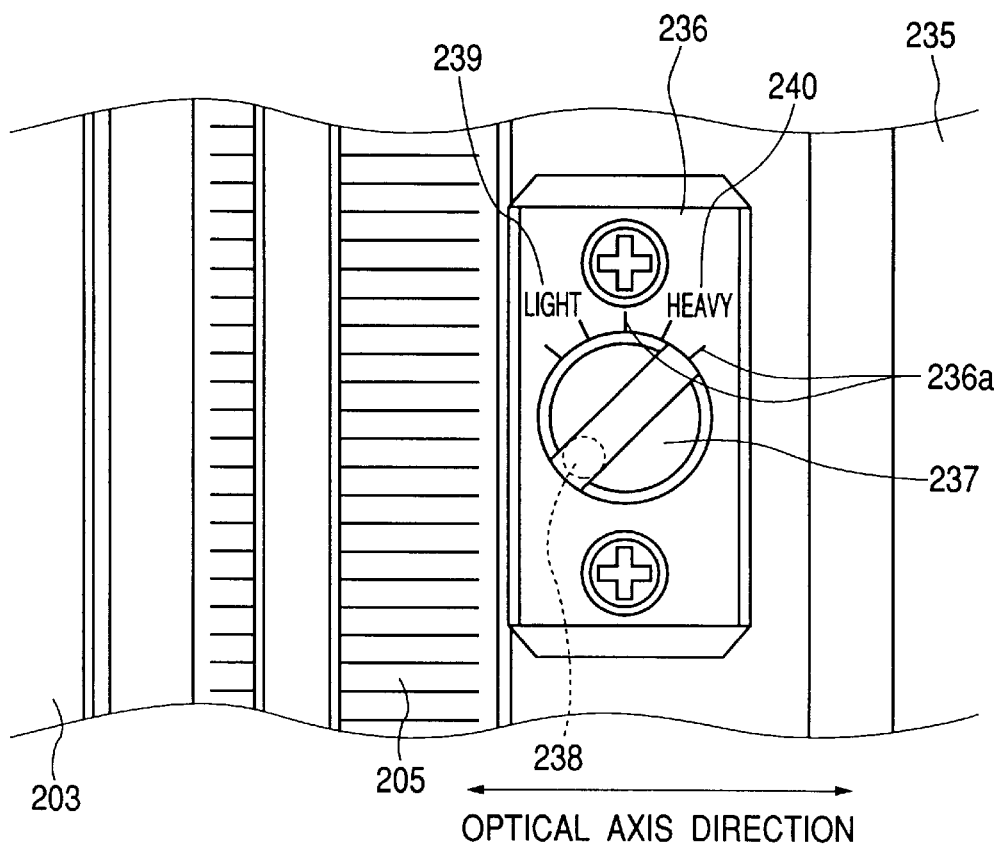
FIG. 27 is a plan view which shows the load adjustment knob shown in FIG. 25.
Figure 28:
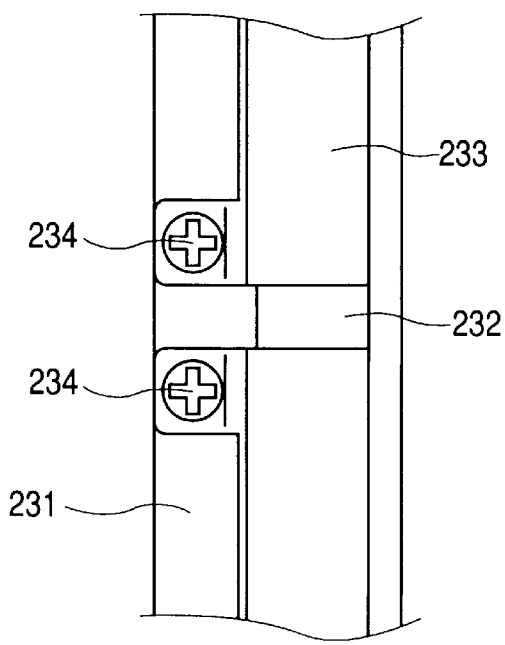
FIG. 28 is a plan view which shows the state of installation of the fixed barrel, operation ring, and supporting member shown in FIG. 25.
Figure 29:
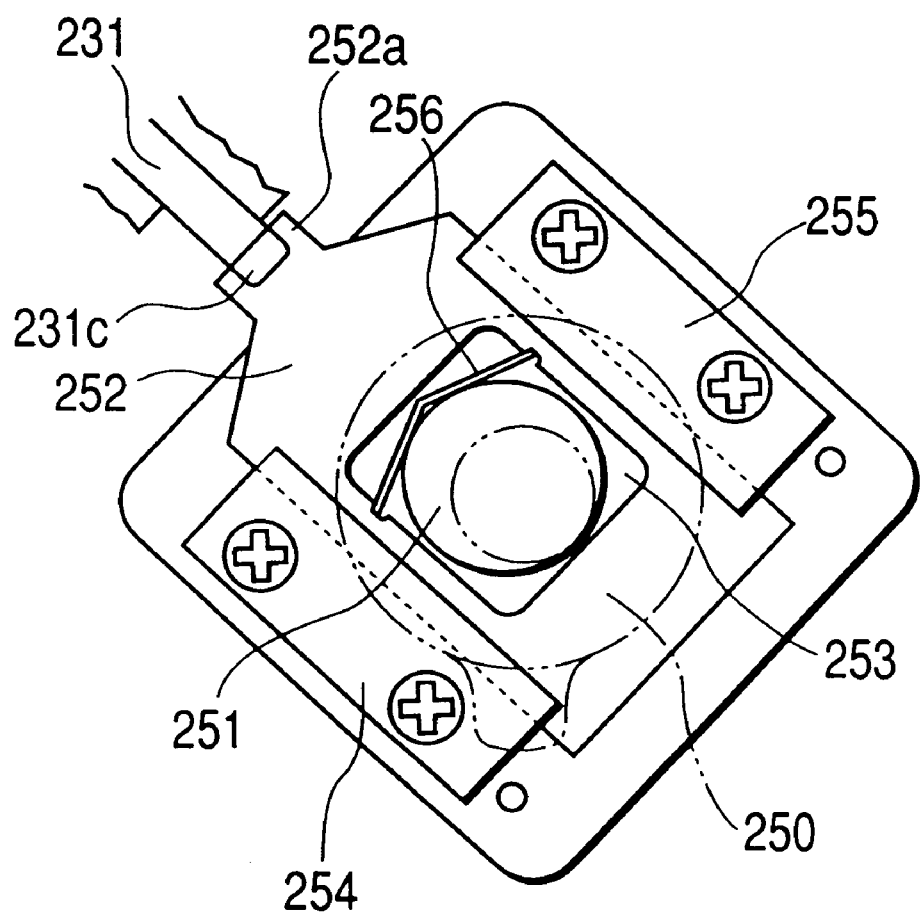
FIG. 29 is a structural view which schematically shows a switching mechanism of manual and electric drive operation.

FIG. 25 is a partially sectional view of an optical barrel, which shows the relational arrangement of the fixed barrel, supporting member and load adjustment knob. FIG. 26 is a partial plan view which shows the optical barrel shown in FIG. 25. FIG. 27 is a plan view which shows the load adjustment knob. FIG. 28 is a plan view which shows the state of arrangement of the fixed barrel, operation ring, and supporting member shown in FIG. 25. FIG. 29 is a structural view which schematically shows the manual/electric drive switching mechanism.

On the outer circumferential surface of the supporting member 231, an elastic member 232 is provided to serve as a pressure member as shown in FIG. 25 and FIG. 28. On the outer circumferential surface of the elastic member 232, a thin plate member 233 is installed as a ring type member for providing slidable contact therewith. The thin plate member 233 is fixed to the supporting member 231 by a fixing screw 234. Here, the structure is arranged so that the outer circumferential surface of the thin plate member 233 and the inner circumferential surface of the operation ring 205 may generate the slidable contact resistance which is made adjustable.

The thin plate member 233 serves as a slidable pressure contact portion 233a, the outer circumferential surface of which is capable of pressing the inner circumferential surface of the operational ring 205 by means of elasticity of the elastic member 232. Then, the slidable pressure contact portion 233a is structured to press the operation ring 205 with a sliding resistance which is larger than the sliding resistance of the slidable contact portion 231a of the fixed barrel 203 of the supporting member 231.

As shown in FIG. 25, the structure is arranged so as to make the operation ring 205 biased to the fixed barrel 203 in the optical axis direction by means of the fixed ring 235 fixed to the fixed barrel 203. Thus, the operation ring is made rotatable without backlash. On the supporting member 236 which is provided on the fixed ring 235, the load adjustment knob (driving mechanism operation unit) 237 is rotatably arranged, which constitutes load adjustment means (driving mechanism). For the load adjustment knob 237, an adjustment pin 238 is installed. The adjustment pin 238 is fitted into a groove 231*b* arranged for the supporting member 231 passing through a circularly elongated hole 235*a* provided on the fixed ring 235.

In accordance with the present embodiment, the adjustment pin 238 is made eccentric with respect to the load adjustment knob 237, for example. Then, following the rotational amounts of the load adjustment knob 237 which rotates around the direction orthogonal to the optical axis direction, the amount of such movement of the adjustment pin 238, which takes place in the optical axis direction, is transferred to the supporting member 231. Then, it is arranged so as to change the contact areas (slidable contact zones) of the slidable pressure contact portion 233*a* of the thin plate member 233, which is slidable in contact with the operation ring 205. Further, as shown in FIG. 27, on the circumference of the supporting portion of the load adjustment knob 237 of the supporting member 236, a "LIGHT" indication label 239 and a "HEAVY" indication label 240 are affixed to specify that if the load adjustment knob 237 is caused to rotate clockwisely, the contact area between the operation ring 205 and the thin plate member 233 is increased, and that if the direction of rotation is reversed, such area is decreased. The labels 239 and 240, and the calibrations arranged between them constitute an index unit that shows the degree of load to be applied on the operation ring 205 depending on the changes of slidable contact zone of the slidable pressure portion 233*a* of the supporting member 231.

Also, the rotation of the operation ring 205 is transmitted to the lens driving unit 242 in the fixed barrel 203 by way of a pin 241. A zoom lens (not shown) is then caused to move in the optical axis direction.

Thus, as shown in FIG. 29, the supporting member 231 is switched by means of switching operation knob 250 so as to be operated electrically or manually. Here, an eccentric cam 251 is integrally formed with the switching operation knob 250. The eccentric cam 251 is arranged in the hole 253 which is arranged in a sliding plate 252. Both ends of the sliding plate 252 are slidably supported by an installation base plate 257 by means of supporting plates 254 and 255. The sliding plate is biased toward the supporting member 231 by means of a flat spring 256. For the sliding plate 252, a triangle-toothed, knurled, or some other simple gear 252*a* is installed to be meshed with the tooth 231*c* of the supporting member 231.

In this respect, the elastic member 232 is formed by material, such as sponge rubber, having resistance to the aged deterioration and good resistance to oil, as well as the capability of absorbing the irregularities of the slidable contact surface (slidable pressure contact portion 233*a*). This member is structured to bias the thin plate member 233 with an even and reasonable force to enable it to press the inner circumferential surface of the operation ring 205.

Also, the thin plate member 233 is formed by metal, synthetic resin, or the like preferably in a thickness of 0.05 to 0.15 mm, having a size that makes it possible to enable its outer circumferential surface to be slightly in contact with the inner circumferential surface of the operation ring 205. In consideration of the event that the operation ring 205 is off from the thin plate member 233, a part of the thin plate member 233 is bent, and at the same time, the operation ring 205 is chamfered so as to prevent the corner of the operation ring 205 from being hooked by the thin plate member 233.

The elastic member 232 and thin plate member 233 are provided on the supporting member 231 after the convex posture thereof has been adjusted by means of a jig or the like.

Further, viscous fluid, such as grease, having an appropriate viscosity is installed between the thin plate member 233 and the operation ring 205 in order to apply a desired load. With the thin plate member 233, the operation ring 205, and grease, the portion (slidable pressure contact portion 233*a*) is formed to generate a first load to be applied on the operation ring 205. In this respect, grease generates viscous resistance to install the smooth stability for the operation ring 205 without any sense of hooking, rolling, slipping, or the like, and at the same time, it is arranged to apply loads so that a sense of lightness is given at the time of slower rotation, while a sense of is given at the time of faster rotation.

Here, the reason why the thin plate member 233 and the operation ring 205 are arranged to be slightly in contact evenly with each other is that in a case where an excessive gap is given between the thin plate member 233 and the operation ring 205 so as not to allow them to be in contact, slippage may take place when handling the operation ring 205 or the operating sense becomes extremely unfavorable, and that, on the contrary, if the outer diameter of the thin plate member 233 is made larger than the inner diameter of the operation ring 205 so as to allow it to be in contact with the operation ring 205 intensively, sliding resistance is created by friction in addition to the viscous resistance of grease, hence making sliding resistance stronger in some cases, with a fear that dryness may be sensed when handling the operation ring.

For the optical apparatus installed with the phototaking lens structured as described above, the switching operation knob 250 is switched to the electric drive if the operation ring 205 should be used for the electric drive. In other words, with the operation of the switching operation knob 250, both the intermediate gear 208 and the sliding plate 252 are moved simultaneously.

The structure is then arranged so that when the switching operation knob 250 rotates toward the electric driving side, the clutching plate 209 rotates to the right through an interlocking mechanism (not shown) to enable the intermediate gear 208 to be meshed with the operation ring 205 (see FIG. 23). Also, when the switching operation knob 250 rotates to the electric driving side, the eccentric cam 251 shown in FIG. 29 rotates to release the meshing between the gear 252*a* of the sliding plate 252 and the tooth 231*c* of the supporting member 231. In this way, the driving power from the driving motor 213 is conditioned to be transmittable to the operation ring 205, while the supporting member 231 is made to be rotatable. At this juncture, the slidable contact portion between the fixed barrel 203 and the supporting member 231 becomes a portion that applies a second load on the operation ring 205.

When driving power is given to the operation ring 205 in this state, the first load, which is the sum of the viscous resistance of grease and the friction resistance between the thin plate member 233 and the operation ring 205 (slidable pressure contact portion 233*a*), is set greater than the second load, namely, the sliding resistance between the fixed barrel 203 and the supporting member 231 (slidable contact portion 231*a*). As a result, the operation ring 205 and the supporting member 231 are allowed to rotate together with respect to the fixed barrel 203.

In this case, the load to be applied on the operation ring 205 is determined by the sliding resistance between the fixed barrel 203 and the supporting member 231. Therefore, the operation ring 205 becomes rotatable by operation that it receives only an extremely small sliding resistance constantly.

In other words, the lens driving system 242 can be rotated without applying any considerable load on the driving motor 213. Also, if the load to the operation ring 205 should become more than a predetermined value, such as an event that the lens driving system 242 has moved to the operation end, and that it comes to an abrupt stop, the torque limiter mechanism of the driving unit 202 functions so that the sleeve 215 slides with respect to the output gear 211 to suspend the rotation of output gear 211. In this way, the tooth 205a, tooth 208a and others are prevented from being damaged.

On the other hand, when the operation ring 205 is handled manually, the switching operation knob 250 is switched to the manual operation side. Here, the structure is arranged so that the clutching plate 209 rotates toward the left to release the meshing state between the intermediate gear 208 and the operation ring 205 (see FIG. 24). Also, when the switching operation knob 250 is switched to the manual operation side, the eccentric cam 251 shown in FIG. 29 rotates to allow the simple gear 252a of the sliding plate 252 to be meshed with the tooth 231a of the supporting member 231. In this way, the transmission of the driving power is interrupted between the driving motor 213 and the operation ring 205. At the same time, the rotation of the supporting member 231 is blocked with respect to the fixed barrel 203.

When the operation ring 205 is manually handled in this state, a first load is applied on the operation ring 205 by means of the sum of the friction resistance on the pressure contact portion 233 and the viscous resistance of grease corresponding to the contact area between the thin plate member 233 and the operation ring 205 (the zone of the pressure contact portion 233a). Then, it is made possible for the operator to rotate the operation ring 205 with an appropriately adjusted load.

Here, if it is required to adjust the load to be applied on the operation ring 205, the load adjustment knob 237 should be operated to rotate in the direction toward the "LIGHT" indication label 239 or toward the "HEAVY" indication label 240. Then, the supporting member 231 moves in the optical axis direction to change the contact area between the thin plate member 233 and the operation ring 205. In accordance with the changes of the contact area, the viscous resistance of grease changes, hence applying a desired load on the operation ring 205.

As described above, in accordance with the present embodiment, it is possible to apply a desired load on the operation ring 205 by causing the supporting member 231 to move in the optical axis direction with respect to the operation ring 205 so that the operator himself can adjust the load applied to the operation ring 205 he desires depending on the object of photography, the phototaking environment, or the like. Also, at the time of electric driving operation, the operation ring 205 can rotate with the load applied on it, but receives only an extremely small sliding resistance constantly between the fixed barrel 203 and the supporting member 231. Therefore, the rotational speed of the operation ring 205 can be increased or the dissipation of electric power can be reduced.

Also, the thin plate member 233 is maintained in close contact with the operation ring 205 by means of the slidable pressure contact portion 233a. As a result, it becomes possible to apply a desired load on the operation ring 205 immediately after the supporting member 231 is moved in the optical axis direction. Then, since the thin plate member 233 and the operation ring 205 are naturally in contact with each other, it is possible to prevent the occurrence of any abrupt motion or the like and the operation is actuated. When the direction of rotation should be reversed, the operation ring 205 can follow the thin plate member 233 in good condition.

Moreover, since the structure is arranged to apply loads directly on the inner diameter of the operation ring 205 by the utilization of the thin plate member 233, it becomes possible to make the unit compact to be suitably adopted for a lens barrel, such as a handy lens, the usable space of which is limited. Also, the structure is such that the operation ring 205 is sandwiched by the fixed barrel 203 and the fixed ring 235 in the optical axis direction. Therefore, the backlash of the operation ring 205 is made extremely small in the optical axis direction.

Further, it may be possible to arrange the structure so that a clicking mechanism (e.g. a detent) is installed for the inner side of the load adjustment knob 237 to make the multiple-staged load adjustment executable in a stepping fashion. Also, by operation of the switching operation knob 250, it is possible to switch over whether or not the driving motor 213 should be in contact, and whether or not the supporting member 231 should be made rotatable at the same time. As a result, the operation is made easier, while preventing any erroneous operations in this respect.

Figure 31:
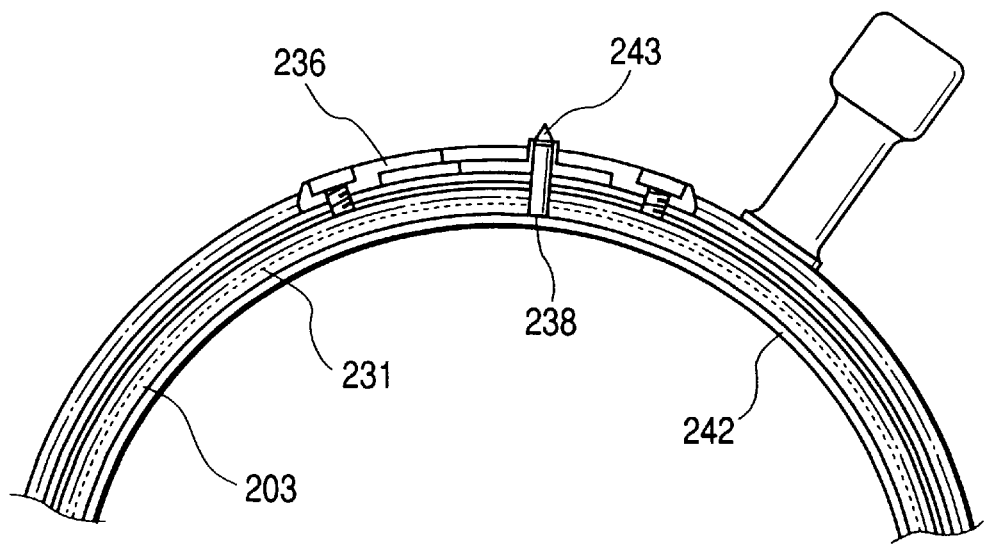
FIG. 31 is a partial front view which shows the optical barrel shown in FIG. 30.
Figure 32:
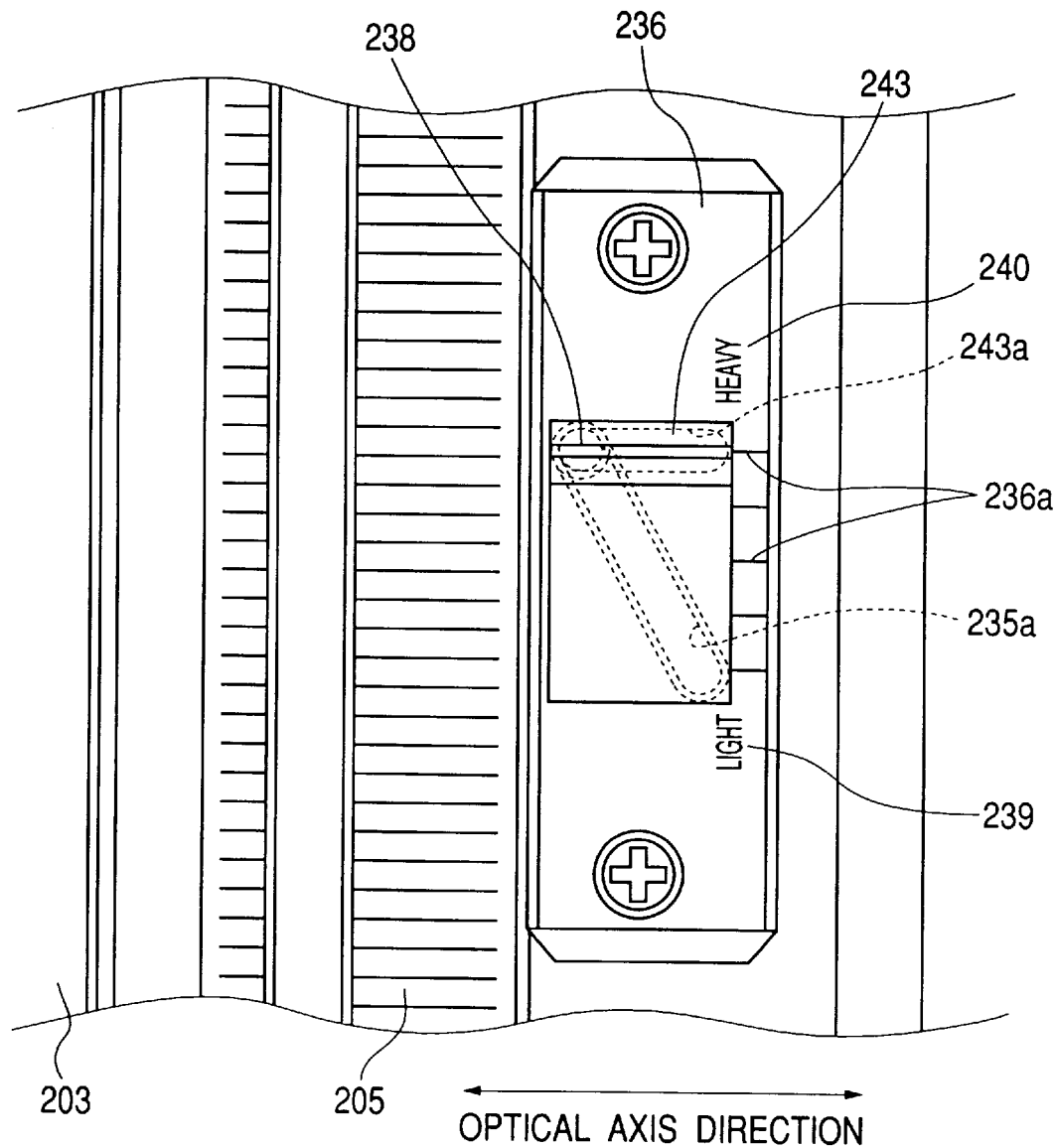
FIG. 32 is a plan view which shows the load adjustment knob shown in FIG. 30.

Now, with reference to FIG. 30 to FIG. 32, the description will be made of an optical barrel and an optical apparatus in accordance with a further embodiment of the present invention.

The optical barrel and the optical apparatus of the present embodiment are the same as those structured in accordance with the previous embodiment with the exception of the use of a sliding type load adjustment knob 213, which enables the supporting member 231 to move in the optical axis direction when the knob is operated to slide with respect to the fixed ring 235, in place of the rotary type load adjustment knob 237 which enables the supporting member 231 to move in the optical axis direction when the knob is operated to rotate with respect to the fixed ring 235. All the other parts are arranged in the same manner as the previous embodiment.

Figure 30:
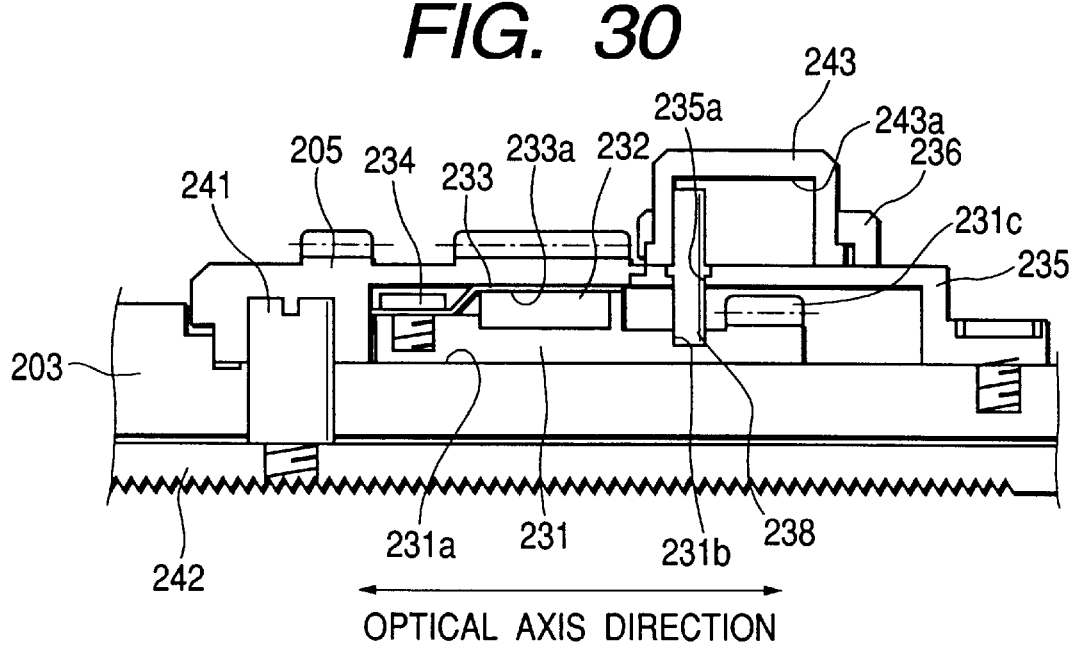
FIG. 30 is a partially sectional view which shows the relational arrangement of the fixed barrel, operation ring, supporting member, and load adjustment knob of an optical device in accordance with another embodiment of the present invention.

FIG. 30 is a partially sectional view of the optical barrel which shows the relational arrangement of the fixed barrel, operation ring, supporting member, and load adjustment knob. FIG. 31 is a partial plan view which shows the optical barrel shown in FIG. 30. FIG. 32 is a plan view which shows only the load adjustment knob.

On the outer circumference of the fixed barrel 203, a supporting member 231 is rotatably arranged as shown in FIG. 30. This member constitutes a part of a substantially cylindrical operation load changing member. The supporting member 231 is released to be rotative for the electric driving operation by means of the switching operation knob 250 that forms a part of the manual/electric drive switching operation means (rotation switching mechanism) described earlier. The supporting member is also fixed to the fixed barrel 203 so that its rotation is disabled at the time of manual operation.

On the outer circumferential surface of the supporting member 231, an elastic member 232 is provided as a pressure member as shown in FIG. 30. On the outer circumferential surface of the elastic member 232, a thin plate member 233 is provided also as a ring type member for the slidable contact thereof. The thin plate member 233 is fixed to the supporting member 231 by means of a fixing screw 234. Here, it is arranged to enable the outer circumferential surface of the thin plate member 233 and the inner circumferential surface of the operation ring 205 to generate a slidable contact resistance which is made adjustable.

The thin plate member 233 is arranged to be a slidable pressure contact portion 233a, the outer circumferential surface of which is made capable of pressing the inner circumferential surface of the operation ring 205 by means of the elasticity of the elastic member 232. Then, the slidable pressure contact portion 233a is structured to be able to press the operation ring 205 by a slidable contact resistance which is greater than the slidable contact resistance of the slidable contact portion 231a of the supporting member 231 with respect to the fixed barrel 203.

As shown in FIG. 30, the operation ring 205 is structured to be rotatable without backlash by being biased to the fixed barrel 203 in the optical axis direction by means of the fixed ring 235 fixed to the fixed barrel 203 by fixing screws. For the holding member 236 installed on the fixed ring 235, a load adjustment knob (driving mechanism operation unit) 243, which constitutes load adjustment means (driving mechanism), is rotatably arranged. For the load adjustment knob 243, an adjustment pin 238 is installed. The adjustment pin 238 is fitted into the groove 231b installed for the supporting member 231 through an elongated hole 235a to be described later, which is drilled on the fixed ring 235.

Here, for the load adjustment knob 243, an elongated groove 243a is arranged in the optical axis direction, for example. Then, for the fixed ring 235, a linearly elongated groove 235a is arranged at an arbitrary angle to the elongated groove 243a of the load adjustment knob 243, for example (see FIG. 32). In this way, when the load adjustment knob 243 is operated to rotate around the optical axis direction, the adjustment pin 238 moves in the optical axis direction through the elongated hole 335a of the fixed ring 235, while being rotated. As a result, the supporting member 231 moves so as to change the contact areas (slidable contact zones) of the slidable pressure contact portion 233a of the thin plate member 233 with respect to the operation ring 205. Further, as shown in FIG. 32, a "LIGHT" indication label 239 and a "HEAVY" indication label 240 are affixed to both movable ends of the load adjustment knob 243 of the fixed ring 235. Thus, it is specified that when the load adjustment knob 243 is caused to rotate toward the label 239 side, the contact area between the operation ring 205 and the thin plate member 233 is decreased, while it is increased when the direction rotation of the knob is reversed. The labels 239 and 240, and calibrations 236a arranged between them constitute an index unit that indicates the degree of load to be applied on the operation ring 205 corresponding to the changes of the slidable contact zone of the slidable pressure contact portion 233a of the supporting member 231.

Also, as a method for converting the rotational amount of the load adjustment knob 243 rotating about the optical axis direction into the amount of movement of the supporting member 231 in the optical axis direction, it may be possible to utilize a screw or the like or some other rotation and linear motion conversion mechanism other than the cam mechanism which is formed by the combination of the elongated groove 243a of the load adjustment knob 243, the elongated hole 235a of the fixed ring 235, and the adjustment pin 238.

Now, as described above, for the optical barrel and the optical apparatus of the present embodiment, the slidable pressure contact portion 233a is arranged to apply a load greater than the sliding resistance of the slidable contact portion 231a of the fixed barrel 203 on the operation ring 205 side of the supporting member 231 which is rotatable, while being slidably in contact with the fixed barrel 203 (barrel main body) and operation ring 205 between them. Therefore, at the time of the electric driving operation of the operation ring 205, it becomes possible to lighten the sliding resistance against the fixed barrel 203, thus enhancing the rotational speed of the operation ring 205. Then, at time of the manual operation of the operation ring 205, the sliding resistance is increased against the operation ring 205. Therefore, it is possible to eliminate the disadvantage that the operation ring 205 tends to rotate easily just by light touch given to the operation ring 205.

Moreover, since the supporting member 231 is arranged to be movable in the optical axis direction, the load to be applied on the operation ring 205 can be set suitably for the rotational operation both for the manual and electric driving of the operation ring 205. At the same time, it is made possible to adjust the load to be applied on the operation ring 205 at the time of manual operation. Therefore, the user (operator) can adjust it as he desires depending on the object of the photography, the phototaking environment or the like.

Further, since the structure is arranged in such a manner that the supporting member 231 itself is movable in the optical axis direction, it becomes possible to make (the diameter of) phototaking lens (optical barrel) 201 smaller.

For the embodiments of the present invention, the description has been made of the operation ring 205 for use with the zoom lens of the phototaking lens 201 as the objective operational member of the optical barrel on which the load is applied. Such operational member may be the operation ring 204 for use with a focus lens or the operation ring 206 for use with an iris operation. To sum up, the present invention is applicable to any one of the operational members that may require manual or electrically driven rotational operation.

Also, a television camera that mounts a phototaking lens 201 therefor is exemplified as the optical apparatus embodying the present invention. However, the present invention is not necessarily limited thereto. It may be applicable to an optical apparatus, such as a film camera, on which a phototaking lens can be detachably and exchangeably mountable.

As described above, in accordance with the present invention, there is installed a load changing member having a slidable contact operational member between the main body of a barrel and the operational member, and then, the area of a slidable contact zone of the load changing member, which is slidable in contact with the operational member, is made movable in the optical axis direction. Therefore, it is possible to materialize a compact optical barrel and an optical apparatus using such optical barrel in which the load to be applied on the operational member can be set suitably at the time of the rotational operation thereof or it can be adjusted as desired by the operator at the time of the manual operation thereof.

What is claimed is:

1. A lens barrel comprising:

an optical lens having an optical axis;

an operation ring substantially cylindrical and operable about the optical axis in order to move said optical lens along the optical axis; and a slidable contact member slidable in contact with an inner circumferential surface of said operation ring, said slidable contact member providing a predetermined load against said inner circumferential surface.

2. A lens barrel according to claim 1, wherein said slidable contact member is movable in the optical axis direction, and wherein an operational torque of said operation ring is changed when a contact area with respect to said inner circumferential surface is changed.

3. A lens barrel according to claim 1, wherein said operation ring is rotatable about said optical axis.

4. A lens barrel according to claim 1, wherein said lens barrel has a motor for driving said operation ring, and wherein said motor drives said operation ring and said slidable contact member together.

5. A lens barrel according to claim 1, wherein said slidable contact member is ring-shaped with respect to the optical axis.

6. A lens barrel comprising:

an optical lens unit having an optical axis;

an operation ring member substantially cylindrical and operable about the optical axis in order to move said optical lens unit along the optical axis;

a slidable member provided on said operation ring member and slidable along the optical axis; and a fixed member adapted to be in contact with said sliding member and be fixed with respect to the optical axis direction, wherein a sliding movement of said slidable member along the optical axis changes a contact area between said fixed member and said slidable member, and thereby changes a load applied to said operation ring member in accordance with the change in the contact area.

7. A lens barrel according to claim 6, further comprising a fixed barrel provided inside said fixed member, wherein said fixed member is fixed with respect to said fixed barrel upon manual operation of said operation ring member, and said fixed member is made rotatable about the optical axis with respect to said fixed barrel upon an electric driving operation of said operation ring member.

8. A lens barrel according to claim 6, wherein said fixed member has a cylindrical shape about the optical axis.

9. A lens barrel comprising:

an optical lens unit having an optical axis;

an operation ring member substantially cylindrical and operable about the optical axis in order to move said optical lens unit along the optical axis;

a fixed barrel having a substantially cylindrical shape about the optical axis and provided inside said operation ring member; and a slidable member provided between said operation ring member and said fixed barrel and slidable along the optical axis so as to change a load for operation of said operation ring member.

10. A lens barrel according to claim 9, wherein said slidable member is in contact with an inner circumferential surface of said operation ring, and a sliding movement of said slidable member along the optical axis changes a contact area between said slidable member and said inner circumferential surface of said operation ring member so as to change a load for operation of said operation ring member.

* * * * *

UNITED STATES PATENT AND TRADEMARK OFFICE
CERTIFICATE OF CORRECTION

PATENT NO. : 5,940,633

DATED : August 17, 1999

INVENTOR(S): HARUHISA YAMAMOTO

It is certified that error appears in the above-identified patent and that said Letters Patent is hereby corrected as shown below:

COLUMN 1,
Line 65, "an" should read --and--.

COLUMN 2,
Line 54, "FIG. 1." should read --FIG. 11.--.

COLUMN 6,
Line 11, "rotatate" should read --rotate--

COLUMN 10,
Line 12, close up the right margin;
Line 13, close up the left margin;
Line 33, "14a," should read --142a,--; and
Line 39, "132" should read --123--.

COLUMN 16,
Line 19, "of" (2nd occurrence) should read --of heaviness--; and
Line 35, "ring." should read --ring 205.--.

UNITED STATES PATENT AND TRADEMARK OFFICE
CERTIFICATE OF CORRECTION

PATENT NO. : 5,940,633

DATED : August 17, 1999

INVENTOR(S): HARUHISA YAMAMOTO

It is certified that error appears in the above-identified patent and that said Letters Patent is hereby corrected as shown below:

COLUMN 21,
Line 1, "slidable" (2nd occurrence) should read --slidably--.

Signed and Sealed this

Twenty-first Day of March, 2000

Attest:

Q. TODD DICKINSON

Attesting Officer

Commissioner of Patents and Trademarks